United States Patent
Michelsohn et al.

(10) Patent No.: US 12,020,013 B2
(45) Date of Patent: Jun. 25, 2024

(54) SOFTWARE UPDATES DISTRIBUTION TO VEHICLES VIA V2V COMMUNICATION AND VERIFICATION BY A COMMUNITY OF VEHICLES

(71) Applicant: RED BEND LTD., Hod Hasharon (IL)

(72) Inventors: Koby Michelsohn, Petach Tikva (IL); Alexander Ashkinazi, Rishon LeZion (IL)

(73) Assignee: Red Bend Ltd., Hod Hasharon (IL)

(*) Notice: Subject to any disclaimer, the term of this patent is extended or adjusted under 35 U.S.C. 154(b) by 216 days.

(21) Appl. No.: 17/432,438

(22) PCT Filed: Feb. 19, 2019

(86) PCT No.: PCT/IL2019/050199
§ 371 (c)(1),
(2) Date: Aug. 19, 2021

(87) PCT Pub. No.: WO2020/170233
PCT Pub. Date: Aug. 27, 2020

(65) Prior Publication Data
US 2022/0147337 A1    May 12, 2022

(51) Int. Cl.
*G06F 8/65*    (2018.01)
*G06F 11/07*   (2006.01)
(Continued)

(52) U.S. Cl.
CPC .......... *G06F 8/65* (2013.01); *G06F 11/0757* (2013.01); *G06F 11/1433* (2013.01);
(Continued)

(58) Field of Classification Search
CPC .......... G06F 8/65; G06F 8/71; G06F 11/0751; G06F 11/1433; G06F 11/3476; G06F 21/57; H04W 4/46; H04W 4/42; H04L 67/34
See application file for complete search history.

(56) References Cited

U.S. PATENT DOCUMENTS 8,775,572 B2 * 7/2014 Gbadegesin .......... H04L 67/125
709/217
2007/0299940 A1   12/2007 Gbadegesin et al.
(Continued)

FOREIGN PATENT DOCUMENTS

CN    105791387 A    7/2016
CN    108093053 A    5/2018
(Continued)

OTHER PUBLICATIONS

Basaras et al., "Blocking Epidemic Propagation in Vehicular Networks", 12th Annual Conference on Wireless On-demand Network Systems and Services, Jan. 20, 2016, pp. 65-72.
(Continued)

*Primary Examiner* — S. Sough
*Assistant Examiner* — Cheneca Smith
(74) *Attorney, Agent, or Firm* — Artegis Law Group, LLP

(57) ABSTRACT

A method of updating Electronic Control Units (ECUs) of vehicles using updates received via Vehicle to Vehicle (V2V) communication channels comprising receiving from nearby vehicle(s) via V2V communication channel(s), one or more of a plurality of update packages distributed for updating a plurality of ECUs deployed in a plurality of vehicles, each of the nearby vehicle(s) is within a reception area of the V2V communication channel(s), analyzing an identifier extracted from each update package to determine whether the update package is directed to ECU(s) of the vehicle, communicating via the V2V communication chan-
(Continued)

nel(s), in case of positive determination, with a subset of the vehicles each maintaining a local log associating each update package with a respective verification code to validate the verification code extracted from the update package according to a consensus of the subset and, in case of successful validation, initiating update of the ECU(s) using the update package(s).

20 Claims, 7 Drawing Sheets

(51) Int. Cl.
    *G06F 11/14*     (2006.01)
    *G06F 11/34*     (2006.01)
    *G06F 21/57*     (2013.01)
    *H04L 67/00*     (2022.01)
    *H04W 4/46*     (2018.01)

(52) U.S. Cl.
    CPC .......... *G06F 11/3476* (2013.01); *G06F 21/57* (2013.01); *H04L 67/34* (2013.01); *H04W 4/46* (2018.02)

(56) References Cited

U.S. PATENT DOCUMENTS

| | | | | |
|---|---|---|---|---|
| 2014/0196021 A1* | 7/2014 | Cheng | ................. | G06F 8/65 717/173 |
| 2016/0210131 A1* | 7/2016 | Vangelov | ................. | H04L 67/12 |
| 2017/0017482 A1* | 1/2017 | Yabe | ................. | G06F 8/65 |
| 2018/0024826 A1 | 1/2018 | Caushi et al. | | |
| 2018/0088928 A1* | 3/2018 | Smith | ................. | H04L 9/3239 |
| 2018/0285088 A1* | 10/2018 | Lancioni | ................. | H04W 4/50 |
| 2019/0050217 A1 | 2/2019 | Tatourian | | |
| 2019/0187971 A1* | 6/2019 | Wang | ................. | H04W 12/06 |
| 2020/0228950 A1* | 7/2020 | Clark | ................. | H04L 67/06 |

FOREIGN PATENT DOCUMENTS

| | | |
|---|---|---|
| CN | 108270573 A | 7/2018 |
| KR | 10-2015-0048136 A | 5/2015 |
| WO | 2014/035908 A1 | 3/2014 |

OTHER PUBLICATIONS

Chitra et al., "Selective Epidemic Broadcast Algorithm to Suppress Broadcast Storm in Vehicular Ad Hoc Networks", Egyptian Informatics Journal, http://dx.doi.org/10.1016/j.eij.2017.04.001, vol. 19, 2018, pp. 1-9.

Ni et al., "The Broadcast Storm Problem in Mobile Ad Hoc Network", VANET Paper Evaluations, Proceedings of the 5th Annual ACM/IEEE International Conference on Mobile Computing and Networking, Aug. 15, 1999, pp. 1-10.

Trullols-Cruces et al., "Worm Epidemics in Vehicular Networks", IEEE Transactions on Mobile Computing, Oct. 2015, pp. 1-14.

Yasser et al., "VANET Routing Protocol for V2V Implementation: A Suitable Solution for Developing Countries", Cogent Engineering, https://doi.org/10.1080/23311916.2017.1362802, vol. 4, Aug. 3, 2017, pp. 1-26.

* cited by examiner

SOFTWARE UPDATES DISTRIBUTION TO VEHICLES VIA V2V COMMUNICATION AND VERIFICATION BY A COMMUNITY OF VEHICLES

CROSS-REFERENCE TO RELATED APPLICATIONS

The present application is a national stage application of the international application titled, "SOFTWARE UPDATES DISTRIBUTION TO VEHICLES VIA V2V COMMUNICATION AND VERIFICATION BY A COMMUNITY OF VEHICLES," filed on Feb. 19, 2019 and having application number PCT/IL2019/050199. The subject matter of this related application is hereby incorporated herein by reference.

BACKGROUND

Some embodiments described herein relate to updating Electronic Control Units (ECUs) of vehicles, and, more specifically, but not exclusively, to updating ECUs of vehicles using update packages received via Vehicle to Vehicle (V2V) communication channels and verified according to a consensus of a community of vehicles.

With the constant advances in the automotive industry, the operation of modern vehicles, such as, for example, cars, trucks, motorcycles and/or the like is heavily reliant on automated systems utilizing multiple Electronic Control Units (ECU) deployed in the vehicle to control almost every aspect of the operation of the vehicle.

These ECUs may control various systems of the vehicle ranging from critical systems to user experience systems, for example, an engine control system, a transmission control system, a breaking system, a lighting system, an infotainment system, a navigation system, a communication system, a door lock system, a window lift system and/or the like.

The ECUs may be processing devices comprising one or more processors executing software, firmware and/or middleware module(s) to provide the required functionality and features. The ECUs may also include one or more programmable logic devices, for example, a Field Programmable Gate Array (FPGA) and/or the like which may be loaded with firmware to map the logic gates of the FPGA to provide the required functionality and features.

Due to the dynamic nature of the automotive industry and the features supported by the vehicles the ECUs may occasionally need to be updated after the vehicles leave the production and delivery centers. The ECUs may therefore be configured to support dynamic update of the software, firmware and/or middleware module(s) using update packages delivered to the deployed vehicles.

SUMMARY

According to a first aspect described herein there is provided a method of updating Electronic Control Units (ECUs) of vehicles using updates received via Vehicle to Vehicle (V2V) communication channels and verified by a vehicles consensus, comprising using one or more processors of a vehicle executing a code for:

Receiving from one or more nearby vehicles, via one or more V2V communication channels, one or more of a plurality of update packages distributed for updating a plurality of ECUs deployed in a plurality of vehicles. Each of the nearby vehicle(s) is within a reception area of the V2V communication channel(s).

Analyzing an identifier extracted from the update package(s) to determine whether the update package(s) is directed to one or more ECUs of the vehicle.

Communicating, in case of positive determination, via the V2V communication channel(s) with at least a subset of the plurality of vehicles each maintaining a local log associating each of the plurality of update packages with a respective verification code to validate the verification code extracted from the update package(s) according to a consensus of the subset of vehicles.

Initiating update, in case of successful validation, of the ECU(s) using the update package(s).

According to a second aspect described herein there is provided a system of updating Electronic Control Units (ECUs) of vehicles using updates received via Vehicle to Vehicle (V2V) communication channels and verified by a vehicles consensus, comprising:

One or more V2V communication interfaces deployed in a vehicle for connecting to one or more V2V communication channels.

One or more processors of the vehicle coupled to the one or more V2V communication interfaces. One or more of the processors execute a code comprising:

Code instructions to receive from one or more nearby vehicles, via V2V communication channel(s), one or more of a plurality of update packages distributed for updating a plurality of ECUs deployed in a plurality of vehicles. The nearby vehicle(s) is within a reception area of the V2V communication channel(s).

Code instructions to analyze an identifier extracted from each of the update package(s) to determine whether the update package is directed to one or more ECUs of the vehicle.

Code instructions to communicate, in case of positive determination, via the V2V communication channel(s) with at least a subset of the plurality of vehicles each maintaining a local log associating each of the plurality of update packages with a respective verification code to validate the verification code extracted from each update package according to a consensus of the subset of vehicles.

Code instructions to initiate update, in case of successful validation, of one or more of the ECU(s) using one or more of the update package(s).

In a further implementation form of the first and/or second aspects, each of the V2V communication channel(s) is a short range communication channel for establishing communication between vehicles located in close proximity.

In a further implementation form of the first and/or second aspects, each of the plurality of update packages is a member of a group consisting of: a firmware update, a middleware update and a software update.

In an optional implementation form of the first and/or second aspects, each of the plurality of update packages is associated with an expiration time tag after which the respective update package is invalid.

In a further implementation form of the first and/or second aspects, each of the plurality of update packages originates from one or more trusted distribution systems adapted to transmit the plurality of update packages to at least some of the plurality of vehicles.

In a further implementation form of the first and/or second aspects, each update package is determined to be directed to respective ECU(s) by comparing between one or more package attributes extracted for the update package(s) and one or more ECU attributes associated with the respective ECU(s).

In a further implementation form of the first and/or second aspects, each of the plurality of vehicles communicates with at least some other vehicles of the plurality of vehicles to continuously update and synchronize its respective local log.

In an optional implementation form of the first and/or second aspects, the local log maintained by each of the subset of vehicles is implemented by a blockchain comprising a plurality of immutable irreversible blocks, each of the plurality immutable irreversible blocks created by one or more trusted distribution systems for a respective one of the plurality of update packages associates the identifier of the respective update package with the verification code of the respective update package.

In a further implementation form of the first and/or second aspects, an identity of each of the one or more nearby vehicles and the identity of each of the subset of vehicles is first authenticated to establish a trusted communication session prior to further data exchange.

In a further implementation form of the first and/or second aspects, the verification code is a hash value calculated for each of the one or more update packages using one or more hash functions such that a respective identifier of each of the plurality of update packages is associated in the log of each of the subset of vehicles with a respective hash value.

In a further implementation form of the first and/or second aspects, the number of vehicles of the subset is set according to one or more security parameters.

In a further implementation form of the first and/or second aspects, one or more of the received update package(s) is transmitted to one or more other nearby vehicles of the plurality of vehicles via the V2V communication channel(s).

In a further implementation form of the first and/or second aspects, the transmission of the update packages is not recorded.

In a further implementation form of the first and/or second aspects, the received update package(s) is locally stored for a predefined time period and available for transmission to one or more other nearby vehicles. The update package(s) is discarded on expiration of the predefined time period.

In an optional implementation form of the first and/or second aspects, the predefined time period is adjusted according to one or more operational parameters of the vehicle. The operational parameters may include a geographical area of the vehicle, a surrounding terrain, an ON/OFF state of the vehicle and/or a speed of the vehicle.

In an optional implementation form of the first and/or second aspects, a predefined no-transmission period is applied between subsequent transmissions of the update package(s) during which the update package(s) is not transmitted.

In an optional implementation form of the first and/or second aspects, a predefined no-reception period is applied following the reception of the update package(s) during which reception of update packages is prohibited.

In an optional implementation form of the first and/or second aspects, one or more of the update packages are cumulatively received in a plurality of separate reception sessions. During each of the plurality of reception sessions established with one or more of the plurality of vehicles the reception of the respective update package is resumed to receive one or more additional portion of the respective update package.

In an optional implementation form of the first and/or second aspects, one or more mobile devices associated with the vehicle receive one or more of the update packages, determine whether the update package(s) is directed to the one or more ECU of the associated vehicle, validates each of the update package(s) and initiates the update using one or more of the update package(s).

Unless otherwise defined, all technical and/or scientific terms used herein have the same meaning as commonly understood by one of ordinary skill in the art to which the embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

Implementation of the method and/or system of some embodiments described herein can involve performing or completing selected tasks manually, automatically, or a combination thereof. Moreover, according to actual instrumentation and equipment of embodiments of the method and/or system of the embodiments described herein, several selected tasks could be implemented by hardware, by software or by firmware or by a combination thereof using an operating system.

For example, hardware for performing selected tasks according to embodiments described herein could be implemented as a chip or a circuit. As software, selected tasks according to embodiments described herein could be implemented as a plurality of software instructions being executed by a computer using any suitable operating system. In some exemplary embodiments described herein, one or more tasks of method and/or system are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments described herein. In this regard, the description taken with the drawings makes apparent to those skilled in the art how embodiments described herein may be practiced.

In the drawings.

DETAILED DESCRIPTION

Figure 1:
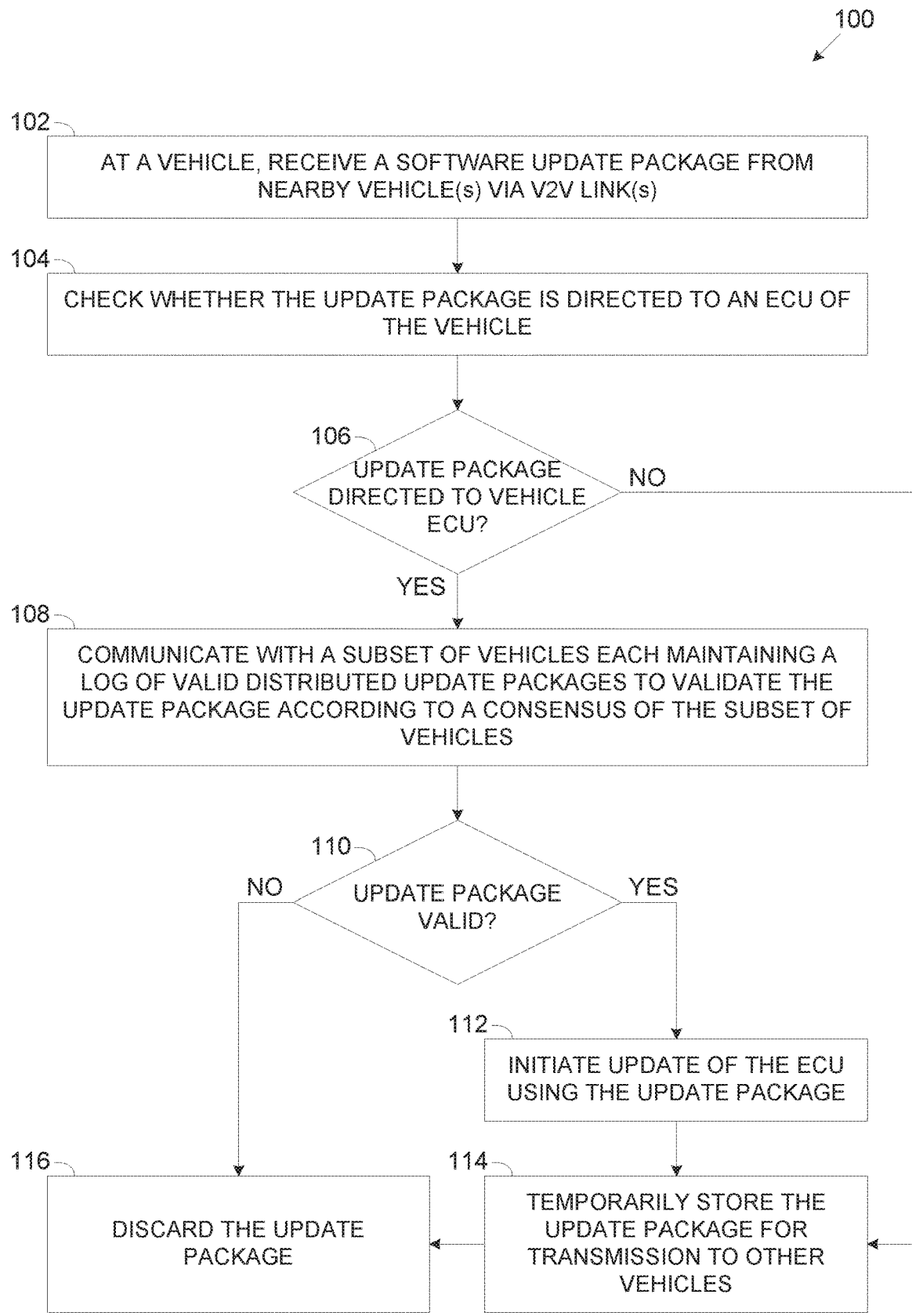
FIG. 1 is a flowchart of an exemplary process of updating Electronic Control Units (ECUs) of vehicles using update packages received via Vehicle to Vehicle (V2V) communication channels and verified by a vehicles consensus, according to some embodiments described herein.

Some embodiments described herein relate to updating ECUs of vehicles, and, more specifically, but not exclusively, to updating ECUs of vehicles using update packages received via V2V communication channels and verified according to a consensus of a community of vehicles.

According to some embodiments described herein, there are provided methods, systems and computer program products for updating ECUs of vehicles using update packages received via V2V communication channels and verified by a consensus of at least some vehicles of a community comprising a plurality of vehicles. As such the community of vehicles serves as both a data plane for distributing the update packages among the vehicles of the community and as a control plane for validating the received update packages based on a consensus of at least a majority of a subset of the vehicles to ensure the received update packages are genuine (authentic) and untampered and are thus eligible for use to update the ECUs.

The update packages, for example, a firmware update, a middleware update, a software update and/or the like which are distributed to the community of vehicles may typically originate from one or more trusted distribution systems associated with one or more trusted vendors, for example, a car manufacturer, a car maintenance service provider, an ECU provider, a software provider and/or the like.

One or more vehicles of the community may receive one or more update packages for updating one or more ECUs deployed in the respective vehicle. In particular, the vehicles may receive the update packages via one or more V2V communication channels from one or more other vehicles.

Since the V2V communication channels are typically short range communication channels having a limited reception range and hence a limited reception area, the vehicles may receive the update packages from one or more encountered nearby vehicles which are within the reception area (range) of the V2V communication channel(s). Due to the short range of the V2V communication channel(s) and the dynamic nature of the vehicles, during an encounter between two or more nearby vehicles a local Ad-Hoc network, connection and/or session (designated Ad-Hoc network herein after) may be established between the nearby vehicles over which the nearby vehicles may communicate with each other, in particular transfer one or more update packages.

Optionally, one or more of the vehicles may receive one or more update packages in a cumulative manner during a plurality of separate reception sessions established with one or more nearby vehicles. During each of the plurality of reception sessions, the vehicle may resume reception of the update package and receive one or more additional portions of the update package. The reception sessions may be repeated until the vehicle accumulates the complete update package.

After receiving an update package the vehicle, specifically an update agent executed by one or more update systems of the vehicle may check whether the received update package is applicable for the vehicle. The update agent may first check whether the received update package is directed to (targets) one or more of the ECUs deployed in the vehicle and in case the received update package is directed to ECU(s) in the vehicle whether the target ECU(s) need to be updated using the received update package.

In case the received update package is determined to be applicable for ECU(s) of the vehicle, the update agent may communicate with a group (subset) comprising at least some other vehicles of the community to validate that the received update package is valid. A valid update package is a trusted update package which is genuine (authentic) originating (released) from the trusted distribution system(s) and is untampered since released by the trusted distribution system(s).

In order to facilitate the control plane for the update packages which is essential for validating update packages in response to queries received from the vehicles receiving these update packages, the community of vehicles may employ one or more distributed computing methods, algorithms and/or protocols. Moreover, while most of the vehicles of the community may be trusted as genuine and honest members of the community, at least some of the vehicles in the community may be untrusted, for example, operated, hijacked and/or compromised by one or more malicious parties thus expose the community of vehicles to one or more cyber threats. Therefore, in order to verify that the distributed computing community of vehicles is immune to such untrusted vehicles, the community of vehicles may employ one or more distributed computing methods, algorithms and/or protocols directed to establish a trusted platform among untrusted community members, for example, a blockchain and/or the like.

As part of the trusted platform control plane, each of the vehicles in the community may therefore maintain a local log (distributed ledger in the blockchain implementation) which associated all the update packages released by the trusted distribution system(s) with respective verification data, for example, a verification code and/or the like. The verification code may include, for example, a hash value calculated for the each of the update packages using one or more hash functions such that each update package is uniquely associated with a respective hash value. Moreover, following the distributed computing paradigm, the plurality of vehicles of the community constantly update and synchronize their local logs with each other such that all logs maintained by a majority (and potentially all) of the vehicles reflect the same verification data for the released update packages.

As the update packages are released only by the trusted distribution system(s), the trusted distribution system(s) are those which generate the verification data which may propagate to all the vehicles in the community which may update and synchronize their local logs accordingly. Moreover, in order to prevent malicious manipulation and/or alteration of the local logs, the trusted distribution system(s) may apply one or more one-way cryptographic algorithms to produce immutable data blocks in the plurality of distributed local logs, for example, the distributed ledge in the blockchain.

As such, in order to validate the received update package, the update agent vehicle may communicate with the subset of vehicles each maintaining its local log and all logs are synchronized with the local logs of all other vehicles of the community.

Based on a consensus of at least a majority of the subset of vehicles achieved (decided) according to the verification data extracted from the synchronized local logs of these vehicles, the update agent may determine whether the received update package is valid or not. The number of vehicles in the subset required to establish the consensus must equal or exceed a predefined threshold, i.e. a predefined number of vehicles which may be set according to one or more security parameters of the community. Such security parameters may include, for example, overall number of vehicles in the community, geographical distribution of the vehicles, type of the community (e.g. privately owned vehicles, organization vehicles, etc.), security level of the data exchanged between the vehicles (e.g. encryption, authentication, etc.), type of the control plane protocol(s), a criticality of the queried update package and/or the like.

In case the received update package is determined to be valid, the update agent may initiate an update session for updating the ECU(s) targeted by the validated update package using the update package. However, in case the received update package is determined to be invalid the update agent may discard the update package.

Regardless of whether the received update package is directed to ECU(s) of the vehicle or not, the update agent temporarily stores the update package for transmission to one or more other vehicles of the community, in particular encountered nearby vehicles with which communication via the V2V communication channel(s) is established.

Moreover, the trusted platform control plane such as the blockchain for example, may be further used to log identification information of the vehicles, for example, an identity (ID) of the vehicles which are part of the community. For example, the Vehicle Identification Number (VIN) of each vehicle may be registered in the trusted platform after the vehicle's identify is properly verified by one or more of the trusted distribution systems.

As such, the local log stored by each vehicle may include the identification information of the vehicles of the community. Using the identification information locally available in the local log, one or more of the vehicles may authenticate each other during the communication sessions established for receiving update package(s) and/or for validating update package(s) to verify the other vehicle is a genuine member of the community.

Modern vehicles may include a very large number of ECUs of various types for controlling the vehicles systems thus an extremely large number of update packages may be released and circulated in the community of vehicles. In addition, as the vehicles of the community are dynamic and mobile they may encounter many nearby vehicles. Due to these reasons, the number of transmission sessions in which a vehicle may engage for transferring update packages to nearby vehicles may be extremely large.

However, since the vehicles ECUs, specifically the update systems executing the update agent may typically have limited storage (e.g. storage capacity), tracking (logging, recording) such extremely large numbers of update packages transmission sessions may be practically impossible. The inability to track these update packages transmissions and determine which update packages were sent to which vehicles may lead to multiple redundant transmission sessions in which the same update package is unnecessarily transmitted multiple times. For example, a certain vehicle may transmit the same update package(s) to the same nearby vehicle(s) multiple times. Also a certain vehicle may receive the same update package multiple times from multiple nearby vehicles.

These redundant and unnecessary transmission sessions may significantly increase network utilization of the V2V communication channel(s) thus significantly reducing effectivity of the communication session between the vehicles. This may further lead to a significant increase in computing resources required by the update agents to handle duplicated copies of the same update package(s).

In order to optimize network performance of the V2V communication channel(s), several network optimization measures may be applied by the vehicles of the community to significantly reduce and potentially prevent the redundant and unnecessary transmission sessions for transmitting duplicates of update packages.

On the transmission side, the update agent executed by one or more of the vehicles may be configured to disable transmission of the same update package multiple times. For example, after transmitting a certain update package, the update agent may enter a no-transmission state for a predefined no-transmission time period during which the certain update package is not transmitted.

On the reception side, the update agent executed by one or more of the vehicles may be configured to disable reception of additional update packages for a predefined no-reception time period after receiving an update package.

The no-transmission time period and/or the no-reception time period may be adjusted according to one or more operational parameters of the vehicle executing the update agent, for example, a geographical area in which the vehicle is located, a surrounding terrain of the vehicle, an ON/OFF state of the vehicle, speed of the vehicle 202 and/or the like.

Optionally, when communicating with one or more other vehicles to receive a certain update package the update agent may check it's local temporarily stored update packages (is exist) to check whether the certain update package was already received previously. In case the certain update package is locally available, the update agent may reject reception of the certain update package to avoid the redundant transmission session.

Distributing the update packages for the vehicles ECUs and validating these update packages according to the consensus of the community of vehicles may present significant advantages compared to currently existing methods and systems for delivering updates to the vehicles' ECUs.

First, the distribution of the update packages relies on direct delivery of the update packages between vehicles rather than delivering the update packages from a limited number of centralized distribution systems as may be done by the existing methods.

In the centralized approach, each of the vehicles may individually access the centralized distribution system(s). Due to the extremely large number of vehicles this individual access may significantly load the networks connecting the vehicles to the centralized distribution system(s). This limitation may be further increased due to the large number and high diversity of the ECUs which may require updates. Overloading the networks may naturally lead to poor service, high latency and optionally reduced reliability of the received update packages. Moreover, communicating with the centralized distribution system(s) as may be done by the existing methods may require the vehicles to infrastructure network capabilities. For example, the vehicles may be equipped with long range network capabilities, for example, cellular network and/or the like which may be costly thus increasing the cost of the update system deployed in the vehicles. In addition, the service cost of such cellular network links may be significantly high thus further increasing the cost for delivering the update packages. In another example, the vehicles may be equipped with short range wireless infrastructure network capabilities, for example, Wireless Local area Network (WLAN) and/or the like. Such network connections may require a physical connection of the vehicle to the network in case of the wired network and/or placing the vehicle in close proximity to an access point of the short range wireless infrastructure. This naturally limits the update packages delivery to certain locations and times during which the vehicles are located in these locations.

In contrast, distributing the update packages between the vehicles via the V2V communications channels may significantly reduce and potentially prevent the network overload for communicating with centralized distribution system(s) as may be done by the existing methods. Moreover, the cost and complexity of the V2V communications channels may be considerably lower than the communication means required for communicating with the centralized distribution system(s). The service cost for communicating via the V2V communications channels may also be negligible compared to the service cost of the communication means required for communicating with the centralized distribution system(s).

The update packages may rapidly and efficiently spread and distribute within the community of vehicles despite the fact that the communication range of the vehicles is limited. This is due to two main facts inherent to the vehicle and to the community. First, the vehicles are mobile and move between geographical areas and locations thus frequently encounter other vehicles of the community. Second, the large number of vehicles further increases the frequency of the vehicles encounters. As each of the extremely large number of vehicles may serve as a carrier of update package(s), during these highly frequent encounters the update packages may be exchanged to rapidly spread among the vehicles of the community.

Furthermore, applying the distributed computing methods, algorithms and/or protocols directed to establish the trusted platform among the untrusted vehicles in the community may overcome the lack of a centralized trusted entity which may be used to verify validity of the update packages as may be done by the existing methods.

While each of the vehicles of the community may need to maintain its local log, the local log may be very limited in size (volume) as it includes only an identifier of each released update package associated with the respective verification data, specifically a limited size hash value. As such, the storage resources required for marinating the local log in each vehicle may be very limited and significantly small.

In addition, applying the network optimization measures may ensure minimal utilization and hence high performance and/or low latency of the network established via the V2V communications channels while avoiding tracking (recording) the update package transmission sessions thus avoiding the need to allocate high storage resources for the update packages tracking and logging. Furthermore, applying the network optimization measures may significantly reduce the computation resources required at the vehicles to handle redundant transmission sessions for transferring duplicates copies of update packages.

Before explaining at least one embodiment described herein in detail, it is to be understood that the embodiments are not necessarily limited in their application to the details of construction and the arrangement of the components and/or methods set forth in the following description and/or illustrated in the drawings and/or the examples. The embodiments described herein are capable of other embodiments or of being practiced or carried out in various ways.

The embodiment described herein may include a system, a method, and/or a computer program product. The computer program product may include a computer readable storage medium (or media) having computer readable program instructions thereon for causing a processor to carry out aspects of the embodiment described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiment described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiment described herein.

Aspects of the embodiment described herein are described with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of updating ECUs of vehicles using update packages received via V2V communication channels and verified by a vehicles consensus, according to some embodiments described herein. An exemplary process 100 may be executed by one or more vehicles of a community comprising a plurality of vehicles for updating one or more ECUs deployed in the respective vehicle using update packages received via one or more V2V communication channels from one or more other vehicles, specifically nearby vehicles which are within the reception range of the V2V communication channel(s). The update packages, for example, a firmware update, a middleware update, a software update and/or the like distributed to the vehicles may typically originate from one or more trusted distribution systems associated with one or more trusted vendors, for example, a car manufacturer, a car maintenance service provider, an ECU provider, a software provider and/or the like.

The V2V communication channels are typically short range communication channels having a limited reception range (e.g. 400 meters) and hence a limited reception area. The update packages may therefore be transferred between nearby vehicles which are within the reception range of the V2V communication channels.

However, the update packages may rapidly and efficiently spread and distribute within the community of vehicles despite the fact that the communication range of the vehicles is limited. This is due to two main facts inherent to the vehicle themselves and to the community of vehicles. First, the vehicles are mobile and move between geographical areas and locations thus frequently encounter other vehicles of the community. Second, the large number of vehicles further increases the frequency of the vehicles encounters. Wherein an encounter is a period of time during which two or more vehicles of the community are nearby each other, i.e., within each other's V2V communication channel(s) reception area (range). During these encounters the nearby vehicles may establish a communication session with each other via the V2V communication channels to exchange data with each other, specifically to transfer one or more update packages. Optionally, one or more of the vehicles receive one or more of the update packages in a cumulative manner by receiving one or more portions of the update package during a plurality of reception communication sessions established with one or more nearby vehicles.

Whenever a vehicle receives an update package it first checks whether the received update package is applicable, i.e. whether the received update package is directed to (i.e., targets) one or more ECUs deployed in the vehicle and if so whether the target ECU(s) need to be updated using the received update package. In case the update package is determined to target the ECU(s) of the vehicle, the vehicle may communicate with a group (subset) comprising at least some of the other vehicles for validating that the received update package is valid, i.e., genuine and untampered as originally released by the trusted distribution system(s).

To facilitate the update packages validation, each of the vehicles in the community maintains a local log which records all the update packages released by the trusted distribution system(s), specifically identification information of all the released update packages. The local logs and further associates each of the released update packages with a verification code. The local logs of all the vehicles of the community are constantly updated and synchronized with each other such that all logs reflect the same update packages and associated verification codes.

Based on their local logs, the group of vehicles approached by the vehicle requesting validation of the update package may respond to the vehicle stating whether the update package is valid or not. The vehicle may then determine whether update package is valid based on a consensus among the members of the group of vehicles. In case the update package is determined to be valid, the vehicle may use it to update the target ECU(s). Else the vehicle may discard the update package.

Regardless of whether the update package is directed to ECU(s) of the vehicle or not, the vehicle may temporarily store the update package for transmission to one or more other vehicles of the community encountered within a certain time period.

Figure 2:
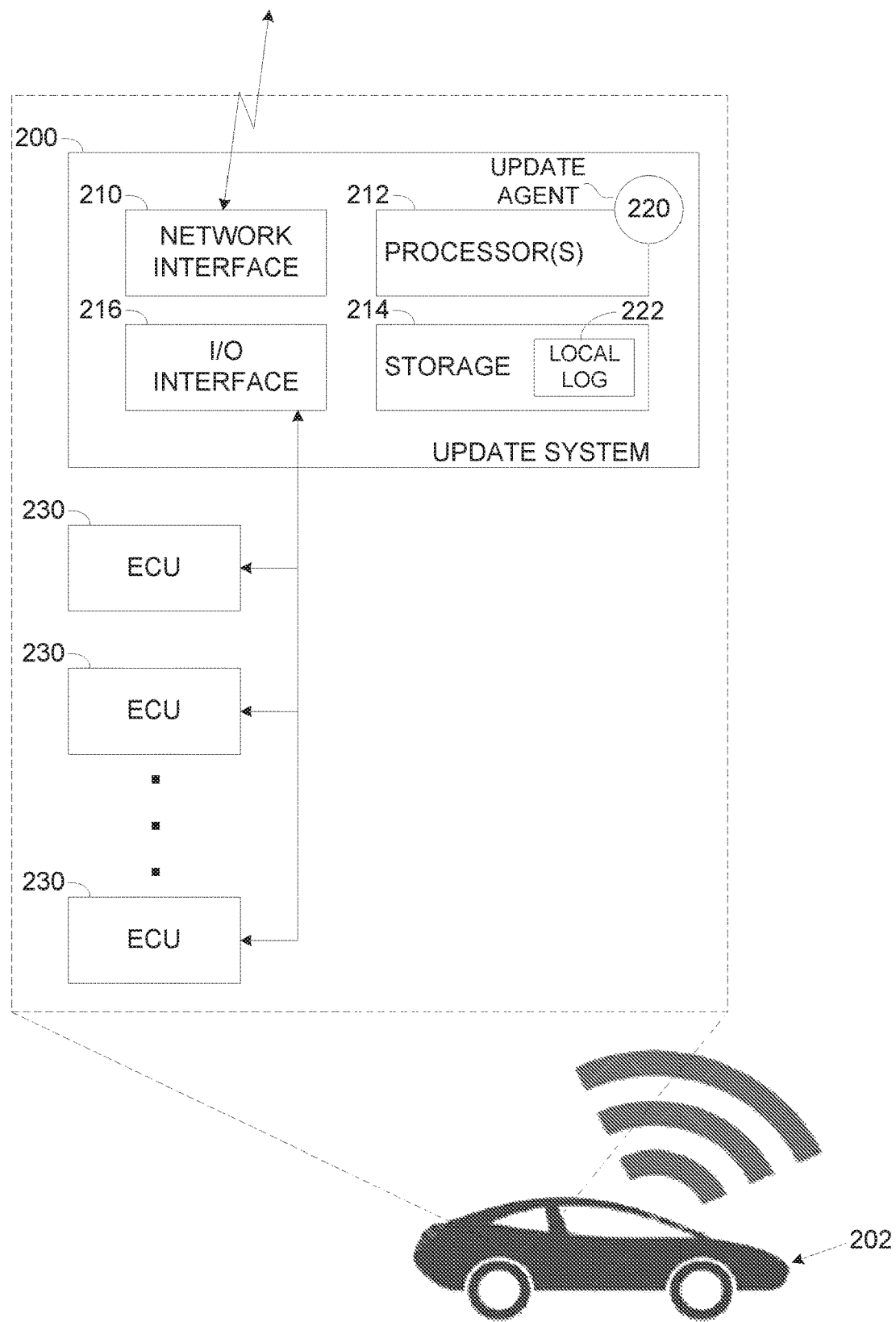
FIG. 2 is a schematic illustration of an exemplary system for updating ECUs of vehicles using updates received via V2V communication channels and verified by a vehicles consensus, according to some embodiments described herein.

Reference is also made to FIG. 2, which is a schematic illustration of an exemplary system for updating ECUs of vehicles using updates received via V2V communication channels and verified by a vehicles consensus, according to some embodiments described herein. An exemplary update system 200 may be deployed in one or more vehicles 202 of the community of vehicles 202 for executing a process such as the process 100. The update system 200 may comprise a network interface 210, a processor(s) 212, storage 214 and an Input/Output (I/O) interface 216.

The network interface 210 may include one or more interfaces, in particular wireless interfaces for connecting to one or more V2V communication channels, for example, Wireless Local Area Network (WLAN, e.g. Wi-Fi), Dedicated Short-Range Communications (DSRC), 5G ($5^{th}$ generation) cellular networks direct Device-to-Device (D2D) side links and/or the like. The network interface 210 may further include one or more interfaces for connecting to one or more infrastructure networks, for example, cellular networks, WLANs, Local Area Networks (LAN), the internet and/or the like.

The processor(s) 212, homogenous or heterogeneous, may include one or more processors arranged for parallel processing, as clusters and/or as one or more multi core processor(s). The storage 214 used for storing program code (program store) and/or data may include one or more non-transitory persistent storage devices, for example, a Read Only Memory (ROM) component, a hard drive, a Flash array and/or the like. The storage 212 may further include one or more volatile devices, for example, a Random Access Memory (RAM) component, a cache memory and/or the like.

The I/O interface 216 may include one or more wired and/or wireless interfaces for connecting to one or more ECUs 230 deployed in the vehicle 202. The I/O interface 216 may include one or more network interfaces, for example, a WLAN interface, a LAN interface, a Control Area Network (CAN) bus, an Aeronautical Radio Incorporated (ARINC) network, a Bluetooth Low Energy (BLE) interface, a Radio Frequency (RF) interface and/or the like. The I/O interface 216 may include one or more wired interfaces for connecting one or more wired interconnections, for example, a serial bus, a Universal Serial Bus (USB) and/or the like.

The ECUs 230 deployed in the vehicle 202 may control one or more of the vehicle 202 systems, for example, an engine control system, a transmission control system, a breaking system, a lighting system, an infotainment system, a navigation system, a communication system, a door lock, a window lift system and/or the like. Each of the ECUs 230 may include a processor(s) such as the processor 212, storage such as the storage 214, an I/O interface such as the I/O interface 218 and optionally a network interface such as the network interface 210.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute an update agent 220 for executing the process 100 to initiate updated to one or more of the ECUs 230 targeted by a package update received from one or more nearby vehicles 202 and verified to be a valid update package. The update agent 220 may further utilize one or more hardware elements, for example, a circuit, a component, an Integrated Circuit (IC), an Application Specific Integrated Circuit (ASIC), a Field Programmable Gate Array (FPGA), a Digital Signals Processor (DSP) and/or the like for executing the process 100.

The processor(s) 212 may further access, maintain and/or update one or more data sets, for example, a file, a record, a table and/or the like stored in the storage 214. In particular, a local log data set 222 may be stored in the storage 214 for associating each of the update packages with a respective verification code used for verifying validity of the update packages. The local log 222 may further include identification information, for example, a VIN of all vehicles 202 which are members of the community. The processor(s) 212 may therefore execute one or more software modules, for example, the update agent 220 a dedicated software module and/or a combination thereof to access, maintain and/or update the local log 222.

The update system 200 may be a dedicated system deployed in the vehicle 202. Optionally, the update system 200 may be integrated in one or more of the ECUs 230 such that the integrated ECU(s) 230 executes the update agent 220 to execute the process 100.

According to some embodiments described herein, a mobile device physically independent of the vehicle 202 may be utilized to support execution of the process 100 to receive one or more update packages, validate them and initiate update of respective target ECU(s) using the validated update package(s).

Figure 3A:
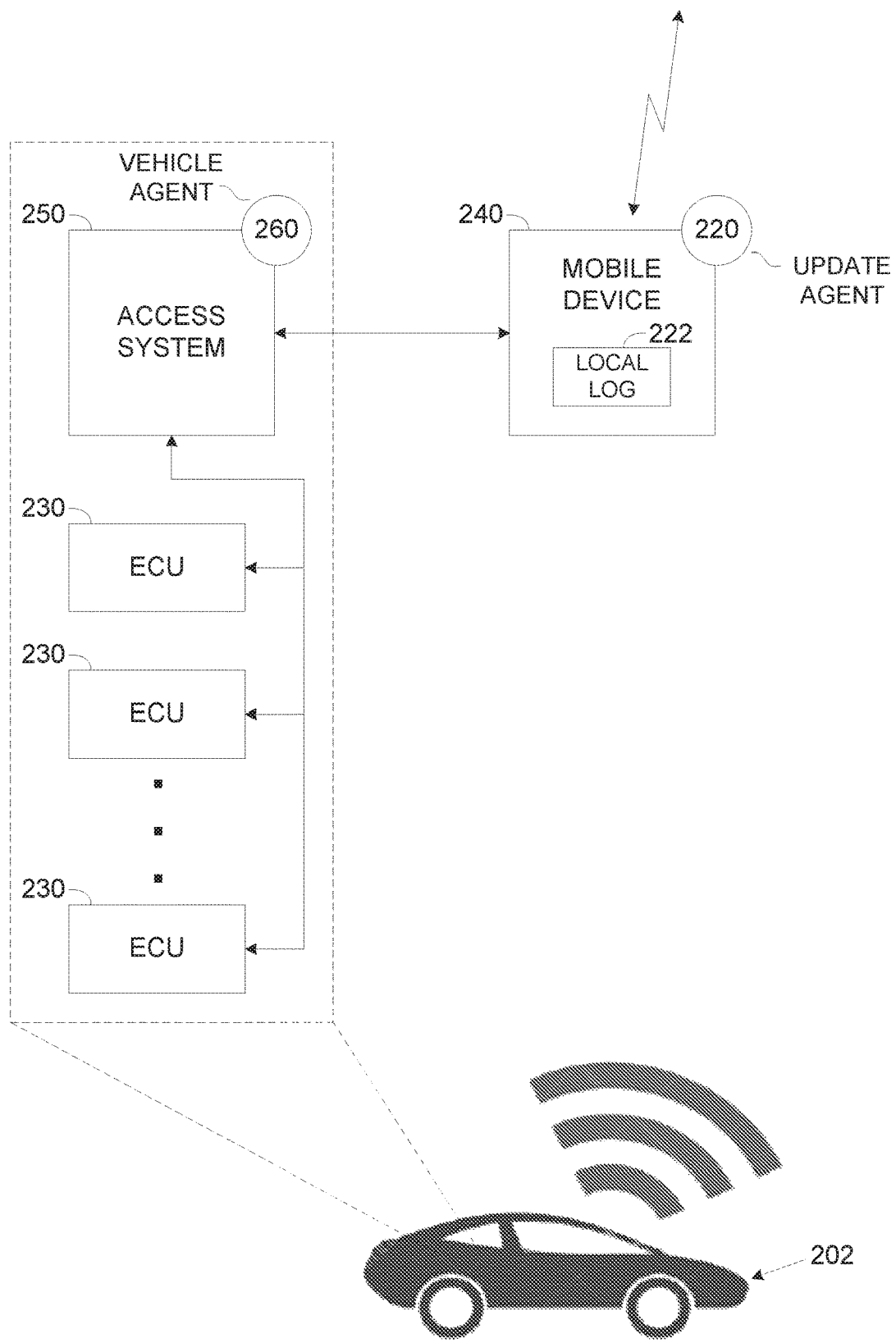
FIG. 3A and FIG. 3B are schematic illustrations of exemplary embodiments of a system using an associated mobile device for updating ECUs of vehicles using updates received via V2V communication channels and verified by a vehicles consensus, according to some embodiments described herein.
Figure 3B:
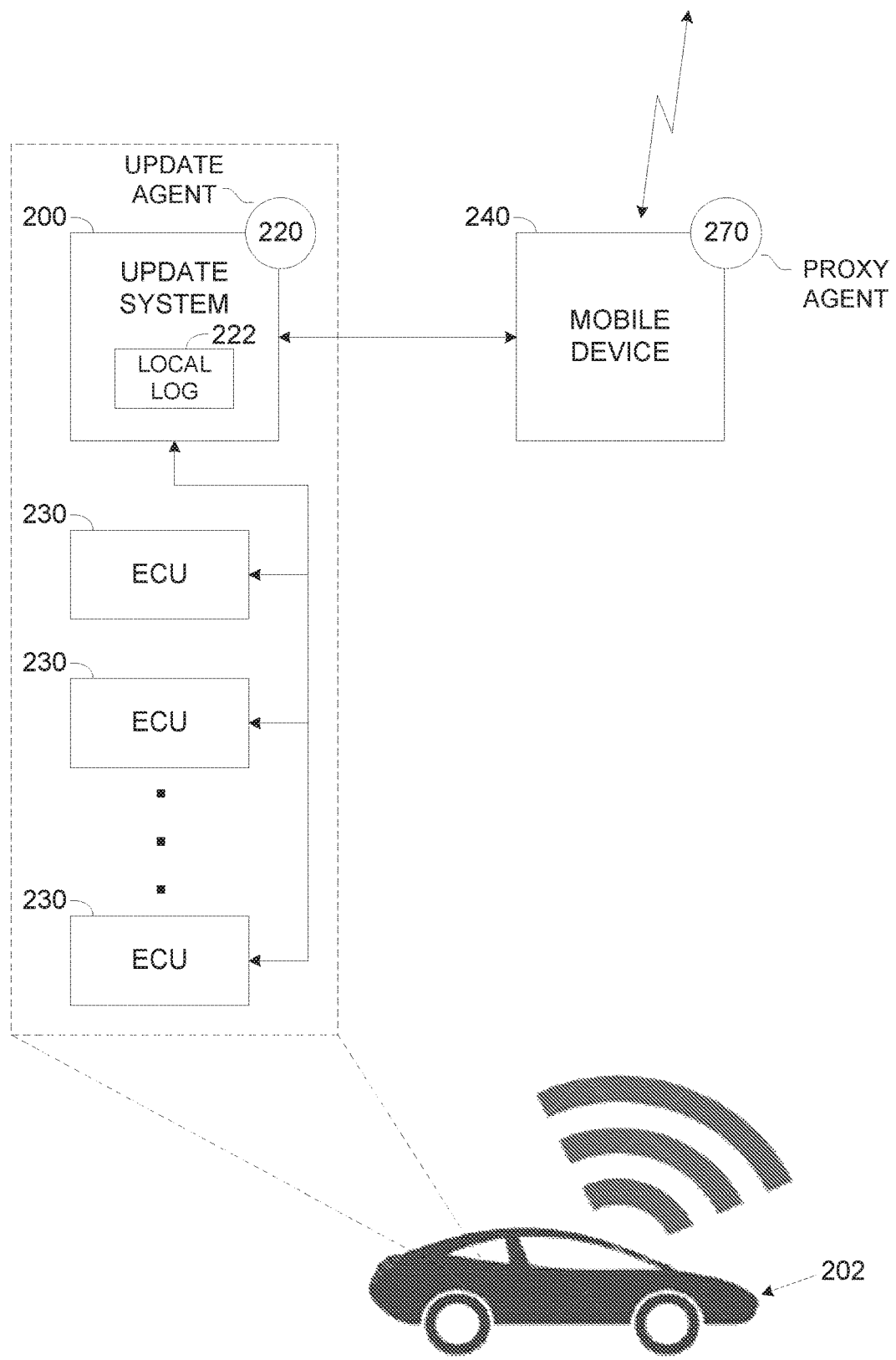

Reference is now made to FIG. 3A and FIG. 3B, which are schematic illustrations of exemplary embodiments of a system using an associated mobile device for updating ECUs of vehicles using updates received via V2V communication channels and verified by a vehicles consensus, according to some embodiments described herein. One or more vehicles such as the vehicle 202 may be associated with one or more mobile devices 240, for example, a Smartphone, a tablet, a laptop computer, a smart watch, a wearable device and/or the like which are physically independent from the respective vehicle 202 to support execution of a process such as the process 100.

The mobile device 240 includes a communication interface such as the communication interface 210, a processor(s) such as the processor(s) 212 and storage such as the storage 214. The processor(s) of the mobile device 240 may execute one or more software modules from the storage of the mobile device 240.

The mobile device 240 associated with a certain vehicle 202 may take an active part in receiving one or more update packages, validating the update package(s) and initiating update process at one or more ECUs such as the ECUs 230. However, the mobile device 240 associated with a certain vehicle 202 may only serve as an intermediary, i.e. a proxy, a gateway and/or the like to provide an update system such as the update system 200 access to one or more networks, specifically V2V communication channels for communicating with other vehicles 202.

As seen in FIG. 3A, the mobile device 240 which is physically independent from the vehicle 202 may be associated (paired) with the vehicle 202 to serve as an update system such as the update system 200 and may execute an update agent such as the update agent 220. The associated mobile device 240 may further store a local log such as the local log 222. Each mobile device 240 executing the update agent 220 corresponds to a specific vehicle 202 such the specific mobile device 240 is uniquely paired (one-to-one relation) with the specific vehicle 202 and the specific mobile device 240 is therefore regarded as part or extension of the specific vehicle 202.

The update agent 220 executed by the mobile device 240 may communicate with one or more of the other vehicles 202. The update agent 220 may further communicate with an access system 250 deployed in the vehicle 202 and capable of communicating with a plurality of ECUs such as the ECUs 230. Optionally, the access system 250 is utilized by one or more of the ECUs 230 of the vehicle 202. The mobile device 240 may communicate with the access system 250 via one or more wired and/or wireless communication channels. For example, the mobile device 240 may communicate with the access system 250 via a WLAN network established between them. In another example, the mobile device 240 may include a wired interconnection interface, for example, a USB port that may be connected to a USB port of the access system 250. Optionally, the mobile device 240 directly communicates with one or more of the ECUs 230 via one or more wired and/or wireless channels established between the mobile device 240 and the ECU(s) 230. For example, the mobile device 240 may connect to one or more of the ECUs 230 via a BLE channel. In another example, a serial interface of the mobile device 240 may be connected to one or more serial channels of the vehicle 202 connecting one or more of the ECUs 230.

The mobile device 240 may be associated (paired) with the vehicle 202 such that a trusted and secure communication link is established between the mobile device 230 and the access system 250 to provide the mobile device 240 access to one or more of the ECUs 230. In particular, the trusted and secure communication link is established between the update agent 220 executed by the mobile device 240 and a vehicle agent 260 executed by the access system 250.

Pairing the mobile device 240 with the vehicle 202 may be done using one or more secure methods, techniques and/or implementations as known in the art in order to establish the trusted and secure communication link with the access system 250. For example, a password based protocol may be applied in which a user of the vehicle 202 (e.g. driver, owner, etc.) inserts a password at both the mobile device 240 and the access system 250. The password may be then used to establish the trusted and secure communication link between the mobile device 240 and the access system 250.

As seen in FIG. 3B, the mobile device 240 may serve as a proxy server for an update system such as the update system 200 to provide the update system 200 access to one or more networks, specifically V2V communication channels for communicating with other vehicles 202. In these deployments, the update system 200 executes the update agent 220 and typically stores the local log 222. To this end, the mobile device 240 may execute a proxy agent 270 to direct network traffic exchanged between the update agent 220 executed by the update system 200 and the other vehicles 202.

Figure 4:
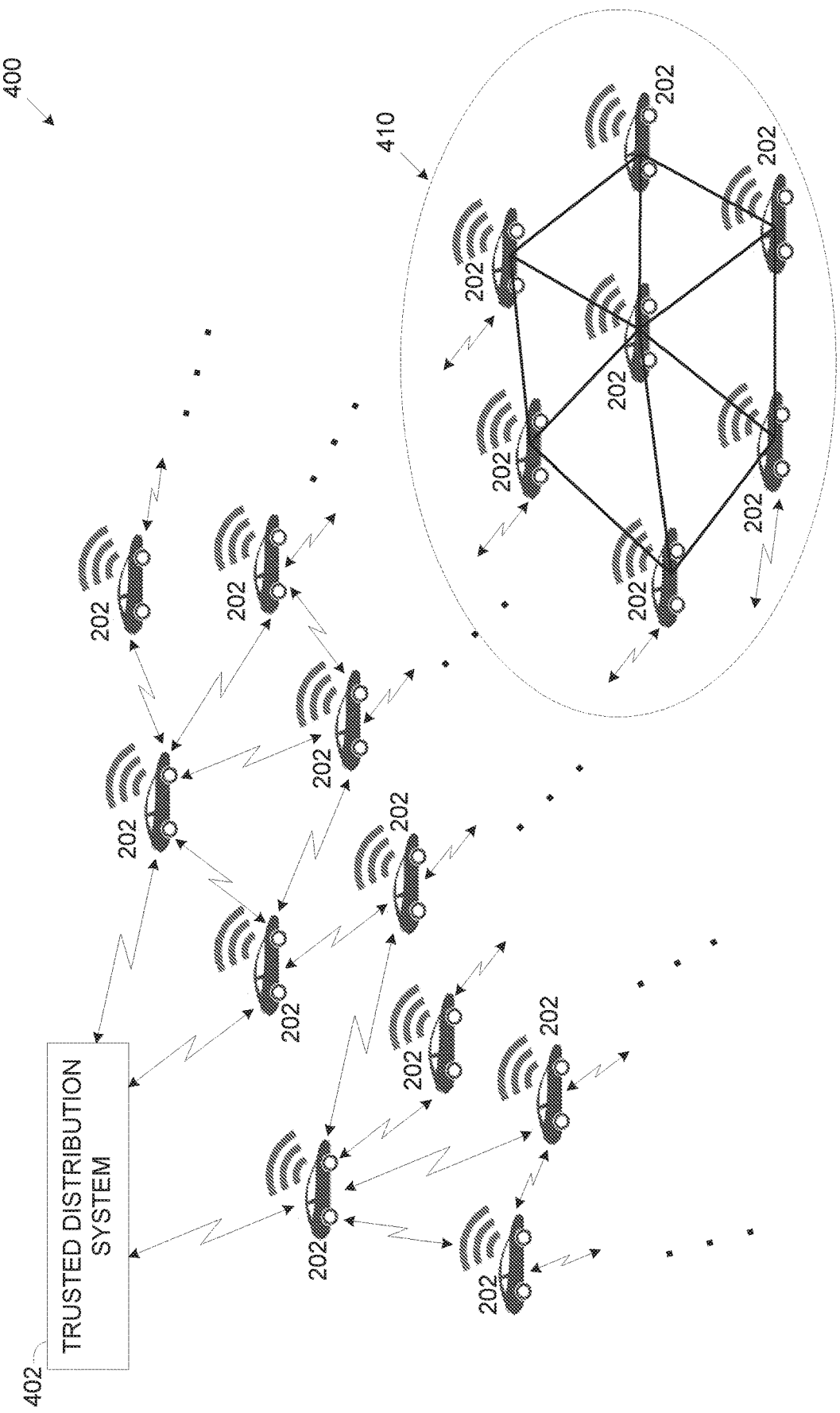
FIG. 4 is a schematic illustration of an exemplary community of networked vehicles using V2V communication channels for distributing and validating update packages directed for ECUs of the vehicles, according to some embodiments described herein.

Reference is now made to FIG. 4, which is a schematic illustration of an exemplary community of networked vehicles using V2V communication channels for distributing and validating update packages directed for ECUs of the vehicles, according to some embodiments described herein. A community 400 of vehicles may include a plurality of vehicles such as the vehicle 202 which may communicate with each other via one or more of the V2V communication channels.

The vehicles 202 of the community 400 may communicate with each other to establish two data distribution planes, the first may be regarded as a data plane for transferring the update packages and distributing them among the vehicles 202 of the community 400 and the second may be regarded as a control plane for transferring verification data relating to the update packages which may be used for validating that the update package are genuine and untampered.

The vehicles 202 of the community 400 may be vehicles manufactured by one or more vehicle manufacturers. Furthermore, the update packages may be designed and/or created by one or more vendors and distributed to the plurality of vehicles 202 of the community 400.

The update packages distributed to the vehicles 202 may originate from one or more trusted distribution systems 402 associated with one or more trusted vendors, for example, a car manufacturer, a car maintenance service provider, an ECU provider, a software provider and/or the like.

Optionally, one or more of the update packages may be associated with an expiration and/or a (Time To Live (TTL) time tag indicating a time period since creation and/or distribution of the respective update package for which the respective update package is valid and may be applied by one or more of the vehicles 202 for updating one or more ECUs such as the ECU 230. One or more of the vehicles 202, specifically an update agent such as the update agent 220 executed by the respective vehicle(s) 202 may have access to timing information such as a current time and date, for example, based on a local Real-Time Clock (RTC), a broadcast RTC, a Global Positioning System (GPS) and/or the like. Based on the current time/data coupled with an analysis of the expiration time tag of a received update package, the update agent 220 may determine whether validity of the received update package. In case the expiration time of the update package is not yet reached, the update agent 220 may determine that the received update package is still valid while in case according to the expiration time tag the update package is expired, the update agent 220 may determine that the update package is no longer valid.

Each of the update packages is associated with verification data, specifically a verification code generated for the respective update package to uniquely encode the contents of respective update package such that the verification code may be used for validating that the respective update package is genuine and untampered. Generating the verification data for the update packages may be done by one or more of the parties involved in producing and/or distributing the update packages. For example, the verification code of one or more of the update packages may be generated by the vendor of the respective update package and delivered to the trusted distribution system(s) 402 with the respective update package for distribution to the vehicles community 400. Optionally, the verification code of one or more of the update package may be generated one or more of the trusted distribution systems 402 prior to distributing the respective update package to the vehicles community 400.

The verification code may be created using one or more methods, techniques and/or algorithms as known in the art. For example, the verification code may be generated by calculating a hash value for a respective update package using one or more hash functions.

Each of the vehicles 202 in the community 400 may maintain a local log such as the local log 222 in which each of the plurality of update packages released by the trusted distribution system(s) 402 for distribution to the vehicles 202 is associated with its respective verification code. In particular, the local log 222 associates a unique identifier assigned to each of the update packages with the respective verification code. The identifier may be assigned to each update package to differentiate the respective update package with respect to one or more attributes, for example, a functionality, a target ECU, a feature set, a version, a build, a release date and/or the like. The verification data (i.e. identifier and associated verification code) may be significantly limited comprising a small data volume (e.g. <1 KB) mainly depending on the algorithms used to create the verification codes. The verification data to be updated in the local logs 222 may be created only by the trusted distribution system(s) 402, specifically upon release of each new update package since the newly released update package needs to be logged in the local logs 222 of the vehicles 202 of the community 400.

Moreover, the local log 222 may be used to store the identification information of the vehicles 202 of the community 400, for example, the (VIN) of each of the vehicles 202.

To establish the control plane for validating the distributed update packages, the vehicles 202 of the community 400 may communicate with each other and optionally with the trusted distribution system(s) 402 to update their local logs 222 in order to maintain all the local logs 222 constantly synchronized with each other. Specifically the vehicles 202 may communicate with each other and optionally with the trusted distribution system(s) 402 to exchange the verification data relating to the newly released update packages in order to update their local logs 222 accordingly.

The vehicles 202 of the community 400 may attempt to communicate with each other and optionally with the trusted distribution system(s) 402 according to one or more communication conditions and/or rules. For example, the vehicles 202 may attempt to continuously establish a communication session with one or more other vehicles 202 and/or with the trusted distribution system(s) 402. In another example, the vehicles 202 may attempt to establish a communication session with one or more other vehicles 202 and/or with the trusted distribution system(s) 402 at predefined time intervals, for example, every predefined time period, at a predefined time of day, at a predefined location and/or the like. In another example, the vehicles 202 may be manually instructed and/or operated to establish a communication session with one or more other vehicles 202 and/or with the trusted distribution system(s) 402, for example, by an owner of the vehicle 202, by a maintenance person and/or the like.

Since the vehicles 202 of the community 400 need to establish trust with each other in order to verify the exchanged verification data is genuine, the vehicles 202 of the community 400 may apply one or more distributed computing methods, algorithms and/or protocols as known in the art for utilizing the control plane and maintaining their local logs 222 synchronized without having a centralized trusted entity. For example, the vehicles 202 of the community 400 may constitute a blockchain network to maintain a blockchain comprising a plurality of immutable irreversible blocks created using one or more one-way cryptographic algorithms as known in the art which present an impossible computation challenge for altering the blocks in the blockchain. As such the local logs 222 maintained by each of the vehicles 202 of the community 400 are utilized as local copies (ledgers) of the distributed blockchain. Each of the immutable irreversible blocks associates the identifier of a certain one of the update packages released by the trusted distribution system(s) 402 with the verification code generated for the respective update package. In this blockchain scheme, only the trusted distribution system(s) 402 which is a verified and trusted entity may append (commit) a new block to the blockchain. Each block in the blockchain is chained to at least some of its preceding blocks using a cryptographic signature thus making the committed block practically immutable and irreversible since a malicious party attempting to manipulate and/or compromise the committed block may require extreme computing resources making it impractical to alter the block. Moreover, in order to compromise the block the malicious party may need to have a substantial number of the vehicles 202 compromised, potentially a majority of the vehicles 202. Compromising such a large group of vehicles 202 may also be impossible thus further ensuring that the blocks in the blockchain are immutable and irreversible.

As described herein before, in order to communicate with other vehicles 202 and optionally with the trusted distribution system(s) 402 to continuously update the local log 222, each of the vehicles 202 of the community 400 may execute one or more software modules, for example, the update agent 220, a dedicated software module and/or a combination thereof.

Since the community 400 comprises the plurality of vehicles 202 which connect to each other on Ad-Hoc basis due to their mobility and intermittently ON and OFF state, the network formed by the vehicles 202 may not be fully connected at all times and may rapidly change its structure and layout. Therefore one or more local Ad-Hoc networks, connections and/or sessions (designated Ad-Hoc networks herein after) 410 may be established between two or more nearby vehicles 202 of the community 400 which are within the reception area defined by the reception range of the V2V communication channel(s) of the nearby vehicles 202. The reception area is therefore limited by the reception range of the V2V communication channel(s) which may typically be in a range of several hundred meters, for example, 400 meters. For example, two or more vehicles 202 driving and/or parking in a parking lot may form such a local Ad-Hoc network 410. In another example, two or more vehicles driving at substantially the same speed in a street, a road and/or the like may form such a local Ad-Hoc network 410. In another example, two or more vehicles temporarily stopping next to each due to one or more traffic conditions, for example, a red traffic light, a traffic jam and/or the like may form such a local Ad-Hoc network 410. Once a certain local AD-Hoc network 410 is established, the vehicles 202 connected to the certain local Ad-Hoc networks 410 may communicate with each other.

Optionally, one or more of the vehicles 202 may communicate with one or more other vehicles 202 and optionally with one or more of the trusted distribution systems 402 via one or more infrastructure networks, for example, a cellular network, a LAN, the internet and/or the like for exchanging the verification data and updating their local logs 202. For example, a certain vehicle 202 may connect via its network interface such as the network interface 210 to one or more cellular base stations and communicate with one or more of the other vehicles 202 and/or with the trusted distribution systems 402. In another example, a certain vehicle 202 may connect via its network interface 210 to one or more wireless access points (e.g. a Wi-Fi access point) providing access to the internet. Once connected to the internet, the certain vehicle 202 may communicate with one or more of the other vehicles 202 and/or with the trusted distribution system(s) 402. Such connection to an access point may be established, for example, while the vehicle 202 is located in a parking lot in which one or more access points are deployed. In another example, while located near a residence and/or an office of a driver and/or an owner of the vehicle 202, the vehicle 202 may connect to one or more access points deployed in the residence and/or the office respectively. In another example, while parked at the residence and/or the office of the driver/owner, a wired network interface provided by the network interface 210, for example, the LAN interface may be connected to a LAN infrastructure available at the residence and/or the office which provides access to the internet and/or to the trusted distribution system(s) 402.

Moreover, in order to establish trust between vehicles 202 communicating with each other, a vehicle 202 which communicates with one or more other vehicles 202 may first require the other vehicle(s) 202 to authenticate itself using one or more authentication methods, techniques and/or algorithms as known in the art, for example, exchanging messages encoded using asymmetric cryptography using Private-Public key pairs and/or the like. To support this each vehicle 202 may have a unique signature to authenticate itself as the originator of the exchanged data messages. The unique signatures may be furthermore used to verify the messages are not tampered. The local log 222 storing the identification information, for example, the VIN of all vehicles 202 of the community 400 may be further used to associate the VIN of each of the vehicles 202 with its unique signature, for example, the public key of the respective vehicle 202. When communicating with each other, each of the communicating vehicles 202 may retrieve the public key of the other vehicle 202 and use the public key to decrypt the received message(s) which are encrypted by the other vehicle 202 using the respective private key. In this manner the communicating vehicles 202 may authenticate each other as well as the content of the exchanged message(s).

Figure 5A:
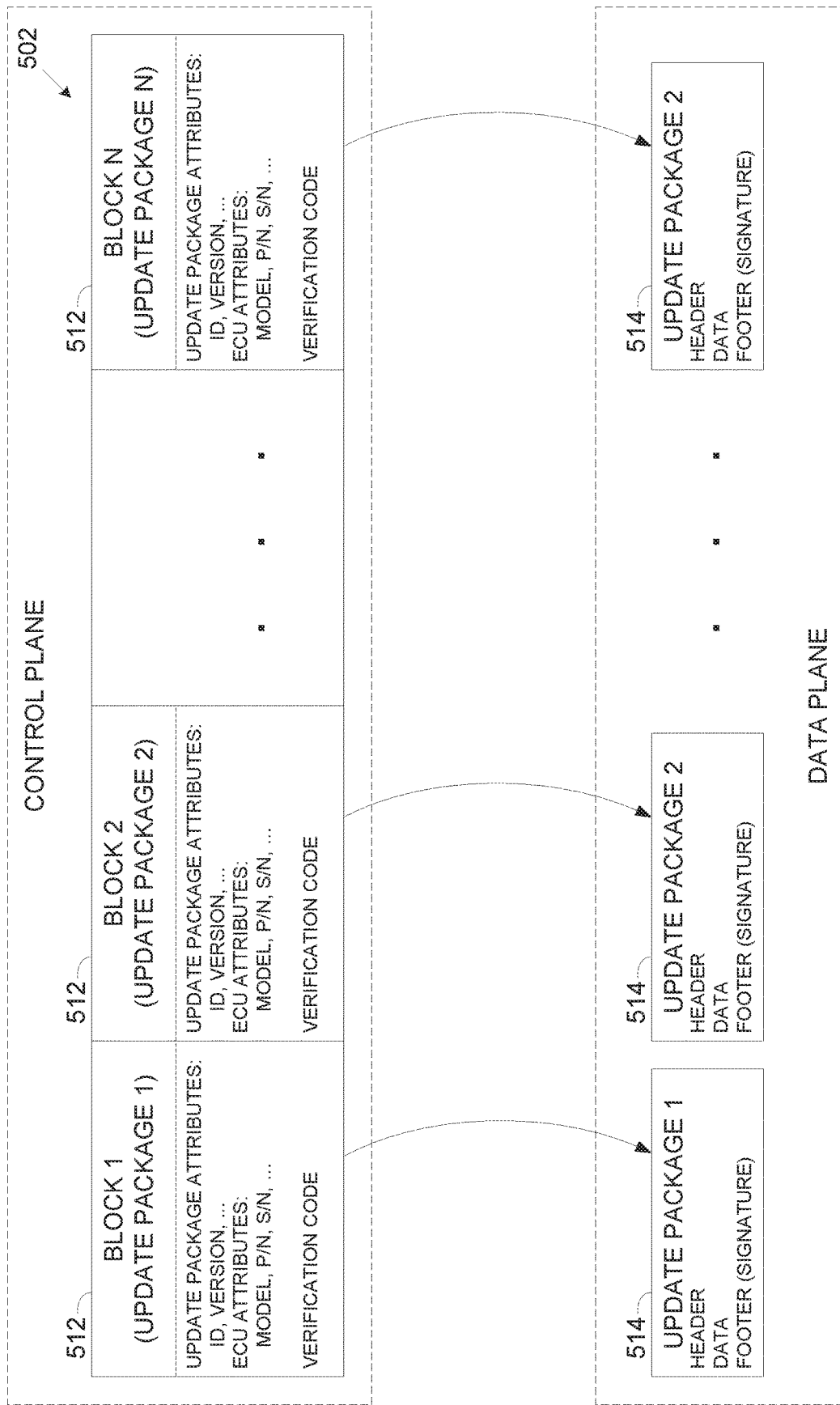
FIG. 5A and FIG. 5B are schematic illustrations of exemplary control plane and data plane used by a community of networked vehicles to transfer and validate update packages directed for ECUs of the vehicles, according to some embodiments described herein.
Figure 5B:
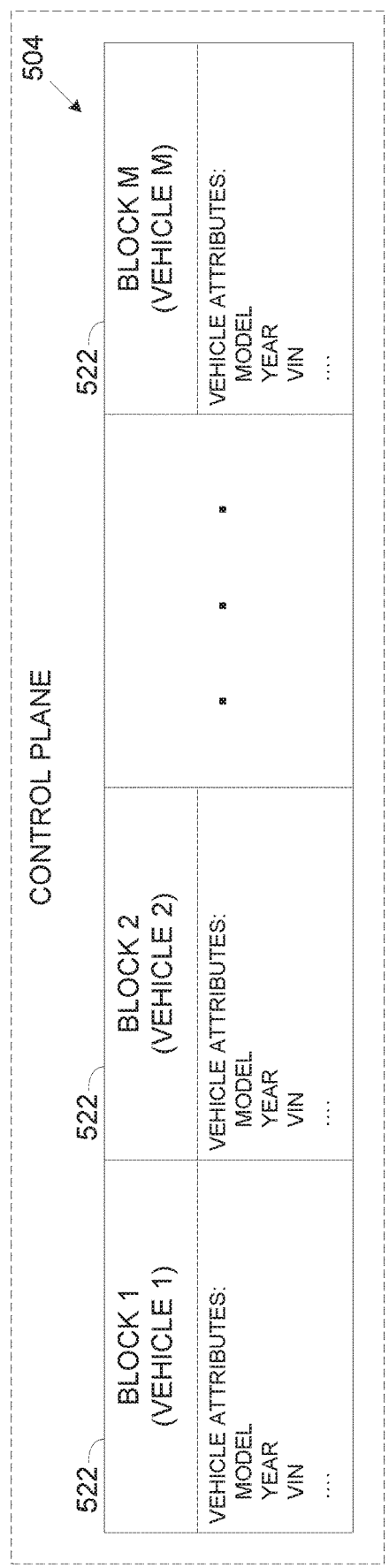

Reference is now made to FIG. 5A and FIG. 5B, which are schematic illustrations of exemplary control plane and data plane used by a community of networked vehicles to transfer and validate update packages directed for ECUs of the vehicles, according to some embodiments described herein.

As seen in FIG. 5A, an exemplary distributed blockchain 502 may be employed by the plurality of vehicles 202 of the community 400 such that each of the vehicles 202 maintains a local log such as the local log 222 comprising a local copy of the blockchain 502. The blockchain 502 may include a plurality of immutable irreversible blocks 512 which are created and appended to the blockchain 502 by the trusted distribution system(s) 402 and associated with a plurality of update packages 514 distributed to the community 400 by the trusted distribution system(s) 402. Each of the blocks 512 is associated with a respective one of the update packages 514, for example, a block 1 may be associated with an update package 1, a block 2 may be associated with an update package 2 and so on to block N which may be associated with an update package N. Each of the update packages 514 may be constructed of one or more segments, for example, a header, a body (data content) and a footer which may serve as a signature.

The vehicles 202 may communicate with each other and/or with the trusted distribution system(s) 402 for synchronizing their local copies of the blockchain 502 with each other via a plurality of transfers which may be regarded as a control plane while the transfer of the update packages 514 themselves may be regarded as a control plane. The data volume included in each of the blocks 512 may be significantly small and the control plane may therefore utilize a significantly low communication bandwidth compared to the data plane used for transferring the large volume update packages 514.

Each of the blocks 512 may include one or more package attributes relating to the respective update package 514. The package attributes may include attributes of the respective update package, for example, an identifier (ID), a revision, a version, a release date and/or the like. In another example, the package attributes may include attributes relating to an ECU such as the ECU 230 targeted by the respective update package 514, for example, a model, a Part Number (P/N), a Serial Number (S/N) and/or the like.

Each of the blocks 512 includes a verification code of the respective update package 514 which may be used for validating the respective update package 514 is valid, i.e., genuine and untampered and optionally whether its TTL is valid. The verification code may be implemented using one or more methods as known in the art. For example, the verification code may be a hash value computed for the respective update package 514 using one or more hash functions.

Optionally, the hash value may serve as the identifier of the respective update package 514 since assuming a sufficiently complex hash function is used the hash value computed for each of the update packages 514 is unique to the respective update package 514. In such case, upon reception of a certain update package 514, an update agent such as the update agent 220 may calculate the hash value of the received certain update package 514 and may compare it against the hash value logged in the respective block 512 associated with the certain update package 514.

As seen in FIG. 5B, another exemplary distributed blockchain 504 may be employed by the plurality of vehicles 202 of the community 400 for logging the vehicles 202 which are genuine members of the community 400. Each of the vehicles 202 may maintain the vehicles blockchain 504 as part of its local log 222 as described herein above. The vehicles blockchain 504 may include a plurality of blocks 522 which may only be created and appended to the vehicles blockchain 504 by the trusted distribution system(s) 402. Each of the blocks 522 may include one or more attributes of the respective vehicle, for example, a VIN, a model, a year of manufacture, a year of joining the community 400 and/or the like.

As described for the blockchain 502, the vehicles 202 may communicate with each other as well as with the trusted distribution system(s) 402 over the control plane to constantly update and synchronize their local copies of the vehicles blockchain 504 to reflect vehicles 202 which joined the community 400 and/or vehicles 202 removed from the community 400. When establishing a communication with another vehicle 202, the update agent 220 may first authenticate an identity of the other vehicle 202 to verify that the other vehicle 202 is a genuine member of the community 400 and may thus be trusted.

Reference is made once again to FIG. 1.

As shown at 102, the process 100 starts with the update agent 220 executed by one or more of the vehicles 202 receiving one or more update packages from one or more vehicles 202 of a community such as the community 400 via one or more of the V2V communication channels provided by the network interface 210 and/or by the mobile device 240. In particular, the update agent 220 may receive the update package(s) from one or more nearby vehicles 202 which are within the reception area of the V2V communication channel(s) of the respective vehicle 202 and with which an AD-Hoc network such as the Ad-Hoc network 410 is established.

As described herein before, a certain vehicle 202 may establish an Ad-Hoc network 410 with one or more other nearby vehicles when located within the reception area of the V2V communication channel(s) of the certain vehicle 202. For example, when the certain vehicle 202 enters a parking lot it may identify one or more nearby vehicles 202 of the community 400 and may establish the Ad-Hoc network 410. In another example, example, the certain vehicle 202 may identify one or more nearby vehicles driving at substantially the same speed for a certain period of time allowing the certain vehicle 202 to establish the Ad-Hoc network 410 with this vehicle(s) 202 driving nearby. In another example, the certain vehicle 202 may temporarily stop and/or drive significantly slow next to one or more nearby vehicles 202 for a substantial period of time due to one or more traffic conditions, for example, a red traffic light, a traffic jam and/or the like. In such case, the certain vehicle 202 may establish the local Ad-Hoc network 410 with theses nearby vehicles 202.

Optionally, prior to receiving the update package(s) from the nearby vehicle(s) 202, the update agent 220 first authenticates the nearby vehicle(s) 202 to verify their identity, for example, using the private-public keys encryption scheme described herein before. To authenticate the nearby vehicle(s) 202, the update agent 220 may compare the VIN received from the nearby vehicle(s) 202 to the VIN logged in the local log 222, specifically in a vehicles blockchain 506.

Optionally, the update agent 220 supports cumulative reception of one or more of the update packages. The update agent 220 may establish a plurality of separate reception communication sessions with one or more nearby vehicles and receive one or more portions of a certain update package until accumulating the entire certain update package. For example, the update agent 220 of a certain vehicle 202 may establish a first reception communication session with a first nearby vehicle 202. During the first reception communication session the update agent 220 may receive a first portion of a certain update package before the first reception communication session is terminated. At a later time, for example, 30 seconds, 2 minutes, a day, a week and/or the like, the update agent 220 of the certain vehicle 202 may establish a second reception communication session with another nearby vehicle 202 which may be the first nearby vehicle 202 and/or another nearby vehicle 202. During the second reception communication session the update agent 220 may resume reception of the certain update package and receive a second portion of the certain update package before the second reception communication session is terminated. The update agent may repeat the reception communication sessions until receiving all portions of the certain update package accumulated to constitute the complete certain update package.

Each update package may be directed to update one or more executable modules, for example, software, firmware, middleware and/or the like and/or one or more non-executable modules (e.g. map data, calibration information, etc.) of one or more target ECUs 230. One or more of the update packages may be further directed to update a gate map of one or more hardware components, for example, an FPGA, an ASIC and/or the like of one or more of the ECUs 230. Each of the update packages may include a full revision update (e.g. a new revision, a previous revision, an updated revision, etc.) for a respective ECU 230 or a differential update to the executable and/or non-executable module(s) already installed in the respective ECU 230.

Each of the update packages originates from one or more of the trusted distribution systems such as the trusted distribution system 402 which are the only entities eligible for releasing the update packages to the community 400 of vehicle 202. Therefore, while the update packages may be designed, produced and/or delivered by one or more software, firmware and/or middleware vendors, the update packages must be first provided to the trusted distribution system(s) 402 which may release these update packages to the community 400.

Optionally, one or more of the update package may be encoded and/or encrypted using one or more encryption keys as known in the art to increase security of the update package during distribution to the community 400.

As shown at 104, the update agent 220 determines whether each of the received update package(s) is directed (targets) for one or more of the ECUs 230 of the certain vehicle 202.

Each of the update packages 230 may be configured according to one or more package attributes of the target ECU(s) 230, for example, a type, a variant, a vendor, a (current) revision and/or the like. For example, a certain update package may be configured to upgrade a plurality of ECUs 230 of a certain type and/or ECUs 230 produced by a certain vendor. In another example, a certain update package may be configured to upgrade every ECU 230 loaded with a certain software module of revisions preceding a certain revision. In another example, a certain ECU 230 may have multiple variants where each of the variants may have different functionality, features and/or capabilities. In such case, multiple versions of a respective update package may be created by a vendor and released by the trusted distribution system(s) 402 for the certain type of ECU 230 where each of the update package versions may be adapted and/or configured for one or more of the variants of the ECU 230.

In order to uniquely identify each of the released update packages, each update package is assigned a unique identifier which uniquely and exclusively identifies the package attribute(s) of the respective update package. The identifier may identify, for example, the type of ECU(s) 230 targeted by the respective update package, i.e., the type of ECU(s) 230 that the respective update package is directed to. In another example, the identifier may identify a version of the respective update package to identify the variant of the ECU(s) 230 targeted by the respective update package. In another example, the identifier may identify a revision of the respective update package. The identifier may be included in the update package using one or more methods, techniques and/or implementations. For example, one or more update packages may include a header comprising the identifier of the respective update package. In another example, the identifier of one or more update packages may be included as metadata of the respective update package. Moreover, the header and/or the metadata may be encrypted using one or more encryption key as known in the art. In another example, the identifier may be implemented by a hash value computed for the respective update package using one or more hash functions configured to generate a unique hash value for each of the update packages.

The update agent 220 may extract the identifier of the received update package(s) and analyze the extracted identifier with respect to the ECU(s) 230 deployed in the vehicle 202 to determine whether the received update package(s) is directed (targets) for one or more of the ECUs 230 of the certain vehicle 202. For example, assuming the identifier of the received update package is its hash value the update agent 220 may calculate the hash value of the received update package and compare the computed hash value to the hash values locally stored in a blockchain such as the blockchain 502 in the local log 222. The update agent may then identify the target ECU(s) 230 associated in the respective block 512 in the blockchain 502 with the computed hash value. In another example, assuming the identifier of the received update package is embedded in the header of the update package, the update agent 220 may retrieve the identifier and compare the identifier to the identifiers locally stored in the blockchain 502 in the local log 222. The update agent may then identify the target ECU(s) 230 associated in the respective block 512 in the blockchain 502 with the retrieved identifier.

For example, based on the analysis of the identifier, the update agent 220 may determine that a certain received update package is directed to a certain type of ECU 230, for example, a certain ECU controlling a steering wheel control system, a certain ECU controlling a breaking system, a certain ECU controlling operation of the head lights and/or the like. In another example, the update agent 220 may determine that a certain received update package is directed for certain ECUs 230 loaded with an older software package revision preceding the revision of the received update package.

The update agent 220 may apply one or more methods to check whether one or more ECUs 230 targeted by the received update package are deployed in the vehicle 202. For example, in a most naïve implementation, the update agent 220 may access each of the ECUs 230 deployed in the vehicle 202 to identify the attributes (parameters) of each of the deployed ECUs 230, for example, a type, a variant, a feature set, a software revision, a most recent update date, a storage capacity and/or the like. The update agent 220 may then analyze the package attributes identified by the identifier of the received update package with respect to the ECU attributes to check for a match indicating that the received update package is directed to one or more of the ECUs 230 deployed in the vehicle 202. In a more efficient implementation, the update agent 220 may maintain a record, for example, a file, a table, a list, a database and/or the like which lists all the ECUs 230 deployed in the vehicle 202 and associated each of the listed ECUs 230 with its respective ECU attributes. In such case, the update agent 220 may analyze the package attributes identified by the identifier of the received update package with respect to the ECU attributes of all ECUs 230 listed in the record and to check for a match indicating that the received update package is directed to one or more of the ECUs 230 deployed in the vehicle 202.

As shown at 106 which is a conditional step, for each of the received update packages, in case the update agent 220 determines that the update package is directed to one or more of the ECUs 230 deployed in the vehicle 202, the process 100 branches to step 108, otherwise the process 100 branches to step 114.

As shown at 108, after the update agent 220 determines that one or more of the received update package(s) are directed to ECU(s) 230 deployed in the vehicle 202, the update agent 220 communicates with at least some of the vehicles 202 of the community 400 to validate that each of the received update package(s) is valid. A valid update package is a genuine update package which originates from the trusted distribution system(s) 402 and is untampered, i.e. the content of the update package was not altered after released by the trusted distribution system(s) 402.

The update agent 220 may communicate with a subset of the vehicles 202 of the community 400 via the V2V communication channel(s) of the vehicle 202. The subset may therefore comprise a plurality of nearby vehicles 202 located with the reception area of the V2V communication channel(s) and forming a local Ad-Hoc network 410.

Optionally, the update agent 220 authenticates each of the subset of nearby vehicle(s) 202 prior to proceeding with validation of the received update package.

Naturally, there may be an overlap between at least some of the nearby vehicles 202 from which the update package(s) is received as described in step 102 and the nearby vehicles 202 of the subset that the update agent 220 interacts with to validate the received update package. However, such an overlap may not necessarily occur since the vehicle 202 (executing the update agent 220) is mobile and may move between geographical locations and areas between the rime of receiving a certain update package and the time of validating the certain received update package. As the vehicle 202 moves it may encounter one or more other nearby vehicles 202 previously out of the reception area of the V2V communication channel(s) of the vehicle 202. One or more new local Ad-Hoc networks 410 may be therefore established (formed) and the update agent 220 may communicate with the nearby vehicle(s) 202 connected to the newly formed Ad-Hoc network(s) 410.

As described here in before, each of the vehicles 202 in the community 400 maintains its respective local log 222 in which each of the plurality of update packages released by the trusted distribution system(s) 402 for distribution to the vehicles 202 of the community 400 is associated with its respective verification data, for example, a respective verification code. As described, the association between the update packages and their verification codes is based on the identifiers uniquely assigned to each of the update packages as described such that each identifier of each update package is associated in the local logs 222 with the respective verification code, for example, the hash value calculated for the respective update package.

Since the vehicles 202 of the community 400 apply one or more of the distributed computing algorithms and/or protocols, for example, the blockchain and/or the like to communicate with each other (control plane) to continuously synchronize their local logs 222 these synchronized local logs 222 may reflect similar verification data (verification codes) for the released update packages.

The update agent 220 may validate the received update package according to a consensus decision negotiated among the subset of vehicles 202 for the queried received update package. The consensus of whether the update package is valid or not may be negotiated and reached between the subset of vehicles 202 using one or more methods, algorithms and/or protocols. For example, as the vehicle 202 executing the update agent 220 is part of the community 400, the update agent 220 may engage in the distributed computing protocol, for example, a Multi-Party Computation (MPC) with the subset of vehicles 202 typically established using secret sharing algorithms as known in the art to produce the consensus decision. The subset of vehicles 202 each having its local log 222 may conduct the MPC session to produce the consensus decision agreed on by a majority of the subset of vehicles 202 according to the verification data available for the queried update package in each of the local logs 222 of each of the subset of vehicles 202.

The number of vehicles 202 in the subset and optionally the type of majority (e.g. absolute majority, relational majority, etc.) required for reaching the consensus decision may be defined according to one or more security parameters of the community 400. The security parameters defined for the community 400 may include, for example, a number of vehicles 202 in the community 400, a geographical distribution of the vehicles 202 (i.e., density or frequency of encounters), a type of the community 400 (i.e. privately owned vehicles 202, company vehicles, etc.), a security level of the data exchanged between the vehicles 202 (e.g. encryption, authentication, etc.), type of protocol(s) employed to maintain the control plane (i.e., the synchronized local logs 222) (e.g. blockchain, etc.), a criticality of the queried update package and/or the like. For example, assuming the community 400 comprises an extremely large number of vehicles 202. In such case the update agent 220 may be configured and/or instructed to communicate with a subset of vehicles 202 which comprises a significantly large number of vehicles 202. In another example, assuming the geographical distribution of at least some of the vehicles 202 of the community 400 is limited to a significantly small geographic area such that encounters between the at least some vehicles 202 are highly frequent. Again, in such case the update agent 220 may be configured to communicate with a subset of vehicles 202 comprising a significantly large number of vehicles 202. In another example, assuming the community 400 includes a plurality of vehicles 202 owned by a corporate and are inaccessible to outside people. Since such a community 400 may be significantly robust against malicious attacks, the update agent 220 may be configured to communicate with a subset of vehicles 202 comprising a relatively small number of vehicles 202. In another example, assuming the vehicles 202 of the community 400 communicate with each other using highly secure communication protocols. In such case, the update agent 220 may be configured to communicate with a subset of vehicles 202 comprising a relatively small number of vehicles 202. In another example, the number of vehicles 202 required for the subset depends on the criticality of queried update package. High criticality update packages may be directed to ECU(s) 230 which control critical systems, for example, the steering wheel system, the breaking system, the acceleration system, an air bag system and/or the like. Low criticality update packages may be directed to ECU(s) 230 which control non-critical systems, for example, the infotainment breaking system, the climate control system and/or the like. Therefore, the more critical the queried update package is the more vehicles 202 are required for the subset with which the update agent 220 communicates to validate the update package. In contrast, the less critical the queried update package is fewer vehicles 202 are required for the subset.

The update agent 220 may further verify that the received update package(s) are valid with respect to their expiration time. The update agent 220 may analyze the expiration time tag assigned to one or more of the received update package(s) and may determine based on comparison with the current time and date whether the received update package(s) are still valid or whether the received update package(s) are expired. The update agent 220 may obtain the current time and date from one or more external timing sources. For example, the update agent 220 may obtain the current time and date from a GPS sensor which receives the current time and date for the GPS system. In another example, the update agent 220 may communicate, via the network interface 210, with one or more infrastructure components deployed in the environment of the vehicle 202 to obtain the current time and date. In another example, the update agent 220 may obtain the current time and date from one or more time keeping modules, for example, an RTC which is constantly or periodically synchronized with one or more of the external timing sources.

As shown at 110 which is a conditional step, for each of the received update package(s), in case the update agent 220 determines, based on the consensus of the subset of vehicles 202 and optionally on the expiration time, that the received update package is valid, the process 100 branches to step 112, otherwise the process 100 branches to step 116.

As shown at 112, after the update agent 220 validates that one or more of the received update package(s) is valid, the update agent 220 may initiate an update of the target ECU(s) 230 using the validated update package(s). For example, the update agent 220 may transmit a certain validated update package to the target ECU(s) 230 for which the certain update package is directed. The target ECU(s) 230 may then use the certain update package to update its software, firmware and/or middleware as instructed by the content of the certain update package. In another example, the update agent 220 may transmit a certain validated update package to a central dispatcher ECU 230 configured to distribute update packages to target ECUs 230. The central dispatcher ECU 230 may then transmit the certain update package to the target ECU(s) 230 which may use the certain update package. In another example, the update agent 220 may transmit a certain validated update package to an updating ECU 230 configured to update one or more target ECUs 230 using the certain update package.

As shown at 114, the update agent 220 may locally store one or more of the received update package(s), for example, in the storage 214 in order to support transmission of the received update package(s) to one or more vehicles 202 of the community 400. As seen in the process 100, the update agent 220 may locally store one or more of the received update package(s) regardless of whether the update package(s) are directed to (target) ECUs 230 of the vehicle 202. This means that the update agent 220 may locally store one or more of the update packages which are not directed to the ECUs 230 of the vehicle 202.

However, due to the large number of ECUs 230 in modern vehicles 202, the number of update packages released to the community 400 may potentially be very large and locally storing a large number of the update packages, for example, in the storage 214 may consume major storage resources. In order to prevent excessive utilization of storage resources of the storage 214, the update agent 220 may store the received update package(s) for a limited predefined (storage) time period after which the respective update package is discarded and removed (deleted) from the storage 214.

During the predefined storage time period, the vehicle 202, in particular a software module executed by a processor(s) of the vehicle 202 such as the processor 212, for example, the update agent 220 may transmit one or more of the stored update package(s) to one or more nearby vehicle(s) 202 encountered in the reception area of the V2V communication channel(s) of the vehicle 202. When encountering such nearby vehicle(s) 202, the update agent 220 may transmit one or more of the stored update package(s) to the nearby vehicle(s) 202 via a local Ad-Hoc network 410 established over the V2V communication channel(s) with the nearby vehicle(s) 202.

The predefined storage time period may be adjusted according to one or more operational parameters of the vehicle 202, for example, a geographical area where the vehicle 202 is located, a surrounding terrain of the vehicle 202, an ON/OFF state of the vehicle 200, a speed of the vehicle 202 and/or the like. For example, in case the vehicle 202 currently stores one or more update packages and is going into OFF state, i.e. the vehicle 202 is turned OFF, the predefined time period may be extended. Extending the predefined time period may prevent discarding the stored update package(s) while the vehicle 202 is not moving and may not be able to effectively circulate and share the stored update package(s) with other vehicles 202. In another example, assuming the vehicle 202 is moving in a dense urban area and hence encounters a large number of nearby vehicles 202. In such vehicle dense geographical areas the update package(s) may be easily circulated by the multitude of vehicles 202 driving in this area. The predefined time period may be therefore significantly reduced since the update packages may be rapidly and quickly shared (transmitted) with other vehicles 202. In contrast, assuming the vehicle 202 is moving in a country side area, for example, an interstate highway, and hence rarely encounters other vehicles 202. In such case the predefined time period may be extended to ensure that the update packages are stored during the potentially long drive on the highway and distributed to other vehicles 202 at a destination of the vehicle 202 thus expanding the circulation of the update package(s) to substantially remote geographical areas. In another example, assuming the vehicle 202 is driving at high speed. In such speeds there is a very low probability that another nearby vehicle 202 will be able to maintain an Ad-Hoc Local network 410 with the vehicle 202 for a time period sufficient for transferring the update package(s). In such case, the predefined time period may be reduced since in such high speeds the update package(s) may not be effectively distributed to other nearby vehicle(s) 202.

The predefined time period may be further adjusted according to the storage capacity of the storage 214. Naturally, the larger the capacity of the storage 214 the longer may be the predefined time period for storing the update package(s). Complementary, the smaller the capacity of the storage 214 the shorter may be the predefined time period for storing the update package(s). Moreover, the predefined time period may be adjusted according to a criticality of the update packages. As such one or more update packages identified as critical may be stored for longer predefined time periods while less important update packages may be stored for shorter predefined time periods.

In order to further prevent excessive utilization of the storage 214, the update agent 220 does not record and/or maintain logs for tracking the transmission events of the stored update packages to the nearby vehicles 202 meaning that the update agent 220 does not record which update packages were transmitted to which vehicles 202. Due to the large number of ECUs 230 in modern vehicles 202, the number of update packages released to the community 400 may potentially be very large. Moreover, the number of vehicles 202 that may be encountered by each vehicle 202 may be extremely large. Therefore maintaining logs for all transmissions of the update packages during all encounters may consume major storage resources. As such, in order to avoid allocation of such substantial storage resources for the update agent 220 to record the transmission events, the update agent 220 does not record, track and/or log these transmission events.

However, since no record or log is made of which update packages were transmitted to which vehicles 202 it is highly probable that in many scenarios multiple nearby vehicles 202 may transmit the same update package(s) to the same vehicle(s) 202 and optionally to each other thus significantly increasing utilization of network resources required for the redundant transmissions of the update package(s). The redundant transmissions of the update package(s) may further consume computing resources at one or more of the vehicles 202 which engage in the transmission and/or reception of identical update package(s).

For example, assuming a first vehicle 202 enters a parking lot and establishes an Ad-Hoc network 410 with a second and a third nearby vehicles 202 and transmits a certain update package to the second and third nearby vehicles 202. After receiving the certain update package, the second and third nearby vehicles 202 may transmit the certain update package back to the first vehicle 202 which naturally already has the certain update package as the certain update package was initially received from the first vehicle 202. In another example, assuming a first vehicle 202 stops in a traffic jam next to several vehicles 202, establishes an Ad-Hoc network 410 with a second and a third nearby vehicles 202 and transmits a certain update package to the second and third nearby vehicles 202. After receiving the certain update package, the second and third nearby vehicles 202 may transmit the certain update package to a fourth nearby vehicle 202. Moreover, the first vehicle 202 may also communicate with the fourth nearby vehicle 202 and may attempt to transmit the certain update package to the fourth nearby vehicle 202. As such the fourth nearby vehicle 202 may receive the same update package from the first, second and third vehicles 202.

One or more measures may be applied in order to prevent one or more of the vehicles 202 from engaging in the redundant transmission sessions initiated for transferring update packages already available to the respective vehicle 202 without the need to record and/or track the transmission sessions. These measures may be applied to improve performance of the networks established between the vehicles 202 and optionally reduce computing resources at the vehicles 202 allocated for update agent 220 for handling identical update packages received multiple times.

A first measure which may be applied by the update agent 220 executed by one or more of the vehicles 202 may be directed to prohibit reception of additional update packages following reception of an update package. The update agent 220 may be configured to wait for a predefined no-reception time period following the reception of one or more update packages. During the no-reception time period the update agent 220 may be disabled to receive additional update packages. The no-reception time period may be adjusted according to one or more of the operational parameters of the vehicle 202, for example, the geographical area where the vehicle 202 is located, the surrounding terrain of the vehicle 202, ON/OFF state of the vehicle 200, the speed of the vehicle 202 and/or the like. For example, assuming the vehicle 202 is moving in a dense urban area and in which it is expected to encounter multiple nearby vehicles 202. In such case the no-reception time period may be adjusted to be significantly long since there is a high probability that the vehicle 202 receive the same update package from multiple nearby vehicles 202 and/or multiple times from the same from nearby vehicle(s) 202. Extending the no-reception time period to be significantly long may allow the vehicle 202 to leave the geographical area in which the same update package(s) is circulated. Moreover, during the extended no-reception time period, the nearby vehicles 202 attempting to transmit the update package(s) may discard their stored update package(s) due to expiration of their predefined storage time period and hence stop repeating transmission of the update package(s). In another example, assuming the vehicle 202 is driving at high speed. In such speeds there is a very low probability that the same nearby vehicle 202 is within the reception area of the vehicle 202 for a long period of time and the no-reception time period may be therefore reduced.

A second measure which may be applied by the update agent 220 is directed to prohibit repeated subsequent transmissions of the same update package(s). The update agent 220 may be configured to wait for a predefined no-transmission time period following transmission of a respective update package. During the no-transmission time period the update agent 220 may be disabled to transmit the respective update package. The no-transmit time period may be adjusted according to one or more of the operational parameters of the vehicle 202, for example, the geographical area where the vehicle 202 is located, the surrounding terrain of the vehicle 202, ON/OFF state of the vehicle 200, the speed of the vehicle 202 and/or the like. For example, assuming the vehicle 202 is moving in a relatively low speed inside a parking lot such that the vehicle 202 is expected to encounter the same nearby vehicles 202 for a long period of time. In such case the update agent 220 which does not record or track the transmission events may initiate multiple transmission sessions to transmit the same update package(s) to the same nearby vehicle 202. In such case the no-transmission time period may be adjusted to be significantly long to prevent the update agent 220 from transmitting the same update package multiple times during multiple transmission sessions since it is likely that at least some of these transmission sessions may be conducted with the same nearby vehicle 202. In another example, assuming the vehicle 202 is driving at high speed where there is a very low probability that the same nearby vehicle 202 is within the reception area of the vehicle 202 for a long period of time. In such case the no-transmission time period may be significantly reduced to enable the update agent 220 to repeatedly transmit the same update package(s) in a plurality of transmission sessions established with nearby vehicles 202 since it is highly probable that each of the transmission sessions is conducted with a different nearby vehicle 202.

Optionally, when communicating with one or more other vehicles 202 to receive a certain update package, the update agent 220 may check whether the certain update package is currently locally stored at the vehicle 202 after previously received and stored for potential transmission to other vehicles 202. The update agent 220 may compare between the identifier of the certain update package and the identifier of each of the currently locally stored update packages to check whether the certain update package was already received at the vehicle 202. In case the update agent 220 determines that the certain update package is locally available as it was previously received, the update agent 220 may terminate the communication session and reject reception of the certain update package to reduce the redundant transmission.

As shown at 116, the update agent 220 discards the received update package(s). The received update package(s) may be discarded due to one or more reasons and execution paths of the process 100. For example, the update agent 220 may discard one or more of the update packages determined to be invalid as described in step 110. In another example, the update agent 220 may discard one or more of the locally stored update packages for which the predefined storage time period has expired.

It is expected that during the life of a patent maturing from this application many relevant systems, methods and computer programs will be developed and the scope of the terms ECU and V2V communication channels are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments described herein may be presented in a range format. It should be understood that the description in range format is merely for convenience and brevity and should not be construed as an inflexible limitation on the scope of the embodiments described herein. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features of the embodiments described herein, which are, for clarity, described in the context of separate embodiments, may also be provided in combination in a single embodiment. Conversely, various features of the embodiments described herein, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A method of updating Electronic Control Units (ECUs) of vehicles using updates received via Vehicle to Vehicle (V2V) communication channels and verified by a vehicle consensus, comprising:

using at least one processor of a vehicle executing a code for:

receiving from at least one nearby vehicle, via at least one V2V communication channel, at least one update package of a plurality of update packages distributed for updating a plurality of ECUs deployed in a plurality of vehicles, wherein the at least one nearby vehicle is within a reception area of the at least one V2V communication channel;

extracting an identifier from the at least one update package and analyzing the extracted identifier;

determining, based on the analyzing, whether the at least one update package is directed to at least one ECU of the vehicle;

communicating, according to the determination, via the at least one V2V communication channel with at least a subset of two or more vehicles included in the plurality of vehicles each maintaining a local log associating each of the plurality of update packages with a respective verification code;

validating the at least one update package using the verification code extracted from the at least one update package, the validation according to a consensus decision negotiated by the subset of vehicles using the verification code; and initiating update, in response to successful validation, of the at least one ECU using the at least one update package.

2. The method of claim 1, wherein the at least one V2V communication channel is a short range communication channel for establishing communication between vehicles located in close proximity.

3. The method of claim 1, wherein each of the plurality of update packages is selected from a group consisting of: a firmware update, a middleware update and a software update.

4. The method of claim 1, wherein each of the plurality of update packages is associated with an expiration time tag after which the respective update package is invalid.

5. The method of claim 1, wherein each of the plurality of update packages originates from at least one trusted distribution system adapted to transmit the plurality of update packages to at least some of the plurality of vehicles.

6. The method of claim 1, wherein the at least one update package is determined to be directed to the at least one ECU by comparing between at least one package attribute extracted for the at least one update package and at least one ECU attribute associated with the at least one ECU.

7. The method of claim 1, wherein each of the plurality of vehicles communicates with at least some other vehicles of the plurality of vehicles to continuously update and synchronize its respective local log.

8. The method of claim 1, wherein:
the local log maintained by each of the subset of vehicles is implemented by a blockchain comprising a plurality of immutable irreversible blocks, and
each of the plurality of immutable irreversible blocks, created by at least one trusted distribution system for a respective one of the plurality of update packages, associates an identifier of the respective update package with a verification code of the respective update package.

9. The method of claim 1, wherein an identity of the at least one nearby vehicle and identities of each of the subset of two or more vehicles is first authenticated to establish a trusted communication session prior to further data exchange.

10. The method of claim 1, wherein the verification code is a hash value calculated for the at least one update package using at least one hash function such that a respective identifier of each of the plurality of update packages is associated with a respective hash value in the local log of each of the subset of two or more vehicles.

11. The method of claim 1, wherein a number of vehicles of the subset is set according to at least one security parameter.

12. The method of claim 1, further comprising transmitting, via the at least one V2V communication channel, the at least one update package to at least one other nearby vehicle of the plurality of vehicles.

13. The method of claim 12, wherein the transmitting of the at least one update package is not recorded.

14. The method of claim 12, wherein:
the at least one update package is locally stored for a predefined time period and available for transmission to at least one other nearby vehicle, and
the at least one update package is discarded on expiration of the predefined time period.

15. The method of claim 14, further comprising:
adjusting the predefined time period according to at least one operational parameter of the vehicle,
wherein the at least one operational parameter is selected from a group consisting of:
a geographical area of the vehicle,
a surrounding terrain,
an ON/OFF state of the vehicle, and
a speed of the vehicle.

16. The method of claim 12, further comprising waiting for a predefined no- transmission period between subsequent transmissions of the at least one update package during which the at least one update package is not transmitted.

17. The method of claim 1, further comprising waiting for a predefined no-reception period following the receiving of the at least one update package during which reception of update packages is prohibited.

18. The method of claim 1, further comprising:
cumulatively receiving the at least one update package in a plurality of separate reception sessions,
wherein, during each of the plurality of separate reception sessions established with at least one of the plurality of vehicles, the receiving of the at least one update package is resumed to receive at least one additional portion of the at least one update package.

19. The method of claim 1, wherein at least one mobile device associated with the vehicle:
receives the at least one update package,
determines whether the at least one update package is directed to the at least one ECU of the vehicle,
validates the at least one update package, and
initiates the update using the at least one update package.

20. A system of updating Electronic Control Units (ECUs) of vehicles using updates received via Vehicle to Vehicle (V2V) communication channels and verified by a vehicles consensus, comprising:
at least one V2V communication interface deployed in a vehicle for connecting to at least one V2V communication channel;
and at least one processor of the vehicle coupled to the at least one V2V communication interface, the at least one processor executes a code comprising:
code instructions to receive, from at least one nearby vehicle via the at least one V2V communication channel, at least one update package of a plurality of update packages distributed for updating a plurality of ECUs deployed in a plurality of vehicles, wherein the at least one nearby vehicle is within a reception area of the at least one V2V communication channel;
code instructions to extract an identifier from the at least one update package, and to analyze the extracted identifier;

code instructions to determine, based on the analysis, whether the at least one update package is directed to at least one ECU of the vehicle;

code instructions to communicate, according to the determination, via the at least one V2V communication channel with at least a subset of two or more vehicles included in the plurality of vehicles each maintaining a local log associating each of the plurality of update packages with a respective verification code;

code instructions to validate the at least one update package using the verification code extracted from the at least one update package, the validation according to a consensus decision negotiated by the subset of vehicles using the verification code; and code instructions to initiate update, in response to successful validation, of the at least one ECU using the at least one update package.

\* \* \* \* \*